US012043030B2

(12) United States Patent
Maeda

(10) Patent No.: US 12,043,030 B2
(45) Date of Patent: Jul. 23, 2024

(54) PRINTING APPARATUS, CONTROL METHOD THEREOF, AND MEDIUM

(71) Applicant: BROTHER KOGYO KABUSHIKI KAISHA, Nagoya (JP)

(72) Inventor: Atsushi Maeda, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 133 days.

(21) Appl. No.: 17/932,350

(22) Filed: Sep. 15, 2022

(65) Prior Publication Data

US 2023/0083297 A1 Mar. 16, 2023

(30) Foreign Application Priority Data

Sep. 16, 2021 (JP) ................................ 2021-151376
Apr. 27, 2022 (JP) ................................ 2022-073449

(51) Int. Cl.
*B41J 2/045* (2006.01)

(52) U.S. Cl.
CPC ....... *B41J 2/04541* (2013.01); *B41J 2/04546* (2013.01); *B41J 2/04581* (2013.01); *B41J 2/04588* (2013.01)

(58) Field of Classification Search
CPC ................ B41J 2/04541; B41J 2/04546; B41J 2/04581; B41J 2/04588
See application file for complete search history.

(56) References Cited

U.S. PATENT DOCUMENTS

2017/0113461 A1 4/2017 Netsu et al.
2023/0311490 A1* 10/2023 Maeda ................ B41J 2/04581 347/11

FOREIGN PATENT DOCUMENTS

JP S5888469 U 6/1983
JP 2010142978 A 7/2010
JP 2017080891 A 5/2017

* cited by examiner

*Primary Examiner* — Justin Seo
(74) *Attorney, Agent, or Firm* — Scully, Scott, Murphy & Presser, PC

(57) ABSTRACT

There is provided a printing apparatus including: a nozzle; a head; a signal generating circuit configured to generate, based on at least a first data representing a first driving waveform and a second data representing a second driving waveform different from the first driving waveform, a time division multiplex signal; a separating circuit to which the time division multiplex signal is inputted and which includes a switch configured to separate, from the time division multiplex signal, a first driving waveform signal representing the first driving waveform or a second driving waveform signal representing the second driving waveform, based on a synchronization signal; and a synchronization signal generating circuit configured to generate the synchronization signal indicating an opening and closing timing of the switch. The synchronization signal generating circuit is a circuit different from the signal generating circuit.

17 Claims, 20 Drawing Sheets

FIG. 18

551

| SYNCHRONIZATION SIGNAL | BIT STRING |
|---|---|
| S2a | 100100100100100100100100100100100 |
| S2b | 001001001001001001001001001001001 |
| S2c | 010010010010010010010010010010010 |
| ▪ | ▪ |
| ▪ | ▪ |
| ▪ | ▪ |

PRINTING APPARATUS, CONTROL METHOD THEREOF, AND MEDIUM

REFERENCE TO RELATED APPLICATIONS

This application claims priorities from Japanese Patent Application No. 2021-151376 filed on Sep. 16, 2021, and Japanese Patent Application No. 2022-073449 filed on Apr. 27, 2022. The entire contents of the priority applications are incorporated herein by reference.

BACKGROUND ART

There is a printer which generates first to fourth driving pulses having different amplitudes, as driving signals for driving a piezoelectric element of each of nozzles. The first to fourth driving pulses are continuously generated during one cycle for printing one pixel. One of the first to fourth driving pulses is selected and applied to the piezoelectric element of each of the nozzles. Each of the nozzles discharges or ejects an ink in an amount corresponding to the amplitude of the selected driving pulse so as to form a dot having a desired size.

DESCRIPTION

According to a first aspect of the present disclosure, there is provided a printing apparatus including:

a nozzle configured to discharge a liquid by an energy generating element;

a head including the energy generating element and the nozzle;

a signal generating circuit configured to generate, based on at least a first data representing a first driving waveform and a second data representing a second driving waveform different from the first driving waveform, a time division multiplex signal including a first portion being a part of the first driving waveform, a second portion being other part of the first driving waveform, a third portion being a part of the second driving waveform and a fourth portion being other part of the second driving waveform;

a separating circuit to which the time division multiplex signal is inputted and which includes a switch configured to separate, from the time division multiplex signal, a first driving waveform signal representing the first driving waveform or a second driving waveform signal representing the second driving waveform, based on a synchronization signal; and a synchronization signal generating circuit configured to generate the synchronization signal indicating an opening and closing timing of the switch.

In the time division multiplex signal, the third portion being the part of the second driving waveform is aligned between the first portion being the part of the first driving waveform and the second portion being other part of the first driving waveform, and the second portion being other part of the first driving waveform is aligned between the third portion being the part of the second driving waveform and the fourth portion being other part of the second driving waveform.

The time division multiplex signal is capable of transmitting the first data and the second data via single signal line.

The synchronization signal generating circuit is a circuit different from the signal generating circuit.

According to a second aspect of the present disclosure, there is provided a method of controlling driving of a printing apparatus including an energy generating element configured to cause a nozzle to discharge a liquid, the method including:

generating, based on at least a first data representing a first driving waveform and a second data representing a second driving waveform different from the first driving waveform, a time division multiplex signal including a first portion being a part of the first driving waveform, a second portion being other part of the first driving waveform, a third portion being a part of the second driving waveform and a fourth portion being other part of the second driving waveform, by a signal generating circuit;

separating a first driving waveform signal representing the first driving waveform or a second driving waveform signal representing the second driving waveform from the time division multiplex signal, by a switch of a separating circuit;

generating a synchronization signal, which indicates an opening and closing timing of the switch, by a synchronization signal generating circuit; and driving the energy generating element by the first driving waveform signal or the second driving waveform signal separated by the separating circuit.

In the time division multiplex signal, the third portion being the part of the second driving waveform is aligned between the first portion being the part of the first driving waveform and the second portion being other part of the first driving waveform, and the second portion being other part of the first driving waveform is aligned between the third portion being the part of the second driving waveform and the fourth portion being other part of the second driving waveform.

The time division multiplex signal is capable of transmitting the first data and the second data via single signal line.

The synchronization signal generating circuit is a circuit different from the signal generating circuit.

According to a third aspect of the of the present disclosure, there is provided a non-transitory and computer-readable medium storing a program thereon, the program being executable by a controller of a printing apparatus which includes an energy generating element configured to cause a nozzle to discharge a liquid, the program is configured to cause the controller to:

cause a signal generating circuit to generate, based on at least a first data representing a first driving waveform and a second data representing a second driving waveform different from the first driving waveform, a time division multiplex signal including a first portion being a part of the first driving waveform, a second portion being other part of the first driving waveform, a third portion being a part of the second driving waveform and a fourth portion being other part of the second driving waveform;

cause a switch of a separating circuit to separate, from the time division multiplex signal, a first driving waveform signal representing the first driving waveform or a second driving waveform signal representing the second driving waveform;

cause a synchronization signal generating circuit to generate a synchronization signal indicating an opening and closing timing of the switch; and drive the energy generating element by the first driving waveform signal or the second driving waveform signal separated by the separating circuit.

In the time division multiplex signal, the third portion being the part of the second driving waveform is aligned between the first portion being the part of the first driving waveform and the second portion being other part of the first driving waveform, and the second portion being other part of the first driving waveform is aligned between the third portion being the part of the second driving waveform and the fourth portion being other part of the second driving waveform.

The time division multiplex signal is capable of transmitting the first data and the second data via single signal line.

The synchronization signal generating circuit is a circuit different from the signal generating circuit.

FIG. 9 is a flow chart explaining a processing performed by a controller in a case that the power of the printing apparatus is turned ON.

FIG. 18 is an explanatory view depicting an example of a synchronization signal table.

Although the four driving pulses are continuously generated during one cycle, only one driving pulse is selected. On this account, the time, which is allotted to the three driving pulses which are not selected, is the waiting time of the nozzle.

The present disclosure has been made taking the foregoing circumstances into consideration, an object of which is to provide a printing apparatus, a control method and a medium each of which is capable of adjusting the amplitude of a driving waveform applied to an energy generating element (energy application element) and reducing the waiting time of a nozzle.

According to a printing apparatus of an embodiment of the present disclosure, it is possible to adjust the amplitude of the driving waveform applied to the energy generating element and to reduce the waiting time of the nozzle.

First Embodiment

Figure 1:
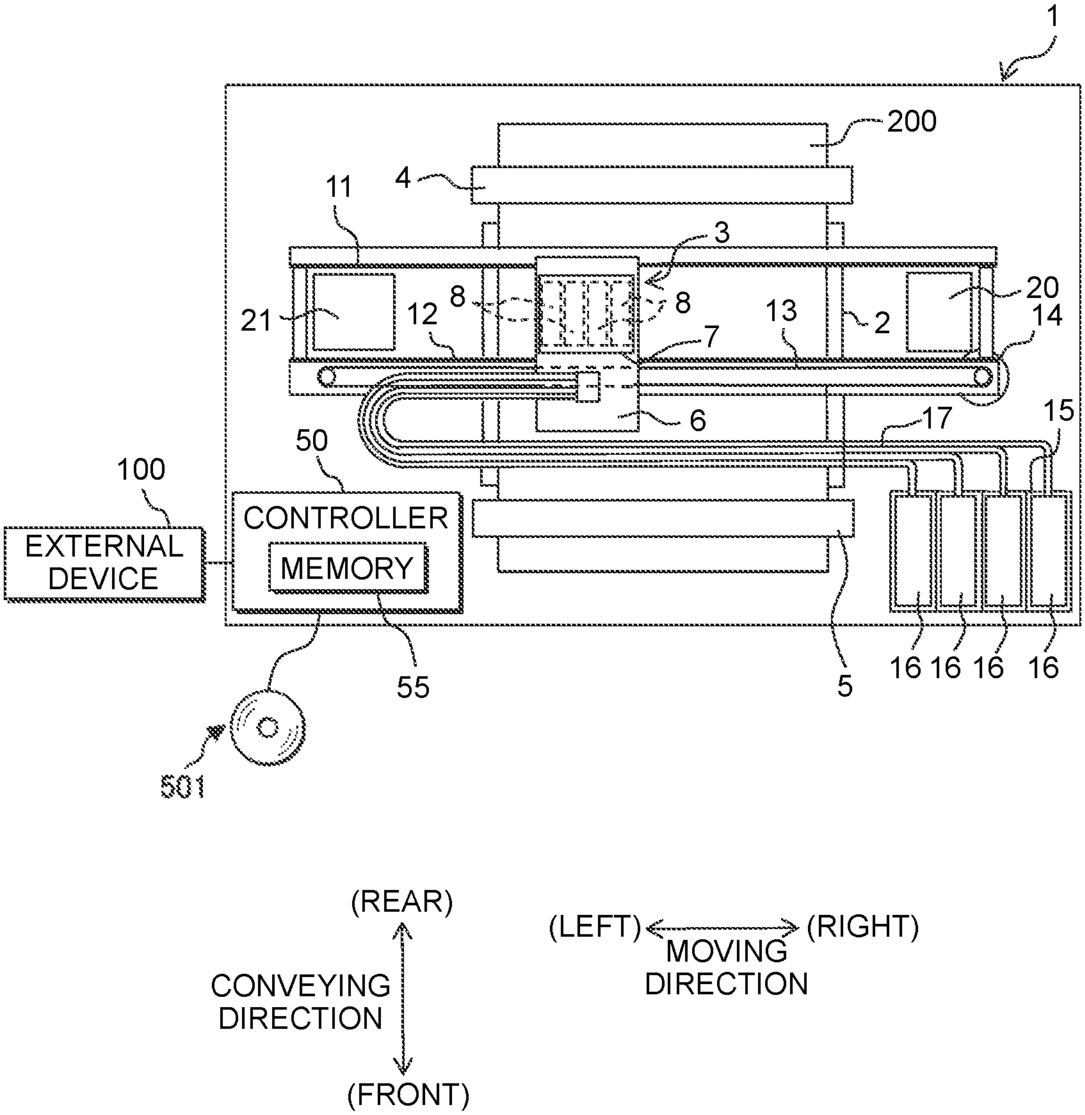
FIG. 1 is a plan view schematically depicting a printing apparatus.

The present disclosure will be explained below on the basis of the drawings depicting a printing apparatus according to a first embodiment. FIG. 1 is a plan view schematically illustrating a printing apparatus 1. In the following explanation, the front, rear, left, and right depicted in FIG. 1 are used. The front-rear direction corresponds to a conveying direction, and the left-right direction corresponds to a moving direction. Further, the surface side of FIG. 1 corresponds to the upper side, the underside corresponds to the lower side in the following explanation, and the upward and downward (the orientation of upward and downward) are also used.

As depicted in FIG. 1, the printing apparatus 1 is provided with a platen 2, an ink discharge device 3, conveying rollers 4 and 5, etc. Recording paper 200, which is a recording medium, is placed on the upper surface of the platen 2. The ink discharge device 3 records an image by discharging or ejecting an ink to the recording paper 200 placed on the platen 2. The ink discharge device 3 is provided with a carriage 6, a subtank 7, four ink-jet heads 8, a circulating pump (not depicted), etc. The printing apparatus 1 is a serial head type printing apparatus which moves the ink discharge device 3 by the carriage 6.

Two guide rails 11 and 12, which guide the carriage 6 and which extend in the left-right direction, are provided above the platen 2. The carriage 6 has a housing (casing). An endless belt 13, which extends in the left-right direction, is connected to the housing of the carriage 6. The endless belt 13 is driven by a carriage driving motor 14. The carriage 6 is guided by the guide rails 11 and 12, and reciprocated in the moving direction in the area facing (opposed to) the platen 2 in accordance with the driving of the endless belt 13. More specifically, in a state that the carriage 6 supports the four inkjet heads 8, the carriage 6 performs a first movement in which the carriage 6 moves the head from a certain position to another position from the left to the right in the moving direction, and a second movement in which the carriage 6 moves the head from the another position to the certain position from the right to the left in the moving direction.

A cap 20 and a flushing receiver 21 are provided between the guide rails 11 and 12. The cap 20 and the flushing receiver 21 are arranged under or below the ink discharge device 3. The cap 20 is arranged at the right end portions of the guide rails 11 and 12, and the flushing receiver 21 is arranged at the left end portions of the guide rails 11 and 12. Note that the cap 20 may be arranged at the left end portions of the guide rails 11 and 12, and the flushing receiver 21 may be arranged at the right end portions of the guide rails 11 and 12.

The subtank 7 and the four ink-jet heads 8 are carried on the carriage 6, and the subtank 7 and the four ink-jet heads 8 are reciprocatively moved (reciprocated) in the moving direction together with the carriage 6. The subtank 7 is connected to a cartridge holder 15 via tubes 17. An ink cartridge 16 of one color or ink cartridges 16 of a plurality of colors (four colors in this embodiment) is or are installed to the cartridge holder 15. The four colors are exemplified, for example, by black, yellow, cyan, and magenta.

Four ink chambers (not depicted) are formed in the inside of the subtank 7. The four color inks, which are supplied from the four ink cartridges 16, are stored in the four ink chambers, respectively.

The four ink-jet heads 8 are arranged side by side in the moving direction under the subtank 7. A plurality of nozzles 80 (see FIG. 2) are formed in the lower surface of each of the ink-jet heads 8. One ink-jet head 8 corresponds to one color of ink and is connected to one ink chamber of the subtank 7. That is, the four ink-jet heads 8 correspond to the four color inks, respectively, and are connected to the four ink chambers, respectively, of the subtank 7.

Each of the four ink-jet heads 8 is provided with an ink supply port and an ink discharge port. The ink supply port and the ink discharge port are connected to the ink chamber of the subtank 7, for example, via tubes. A circulating pump is intervened between the ink supply port and the ink chamber.

The ink sent from the ink chamber of the subtank 7 by the circulating pump flows into the ink-jet head 8 through the ink supply port, and the ink is discharged from the nozzle 80. The ink, which has not been discharged from the nozzle 80 returns to the ink chamber of the subtank 7 through the ink discharge port. The ink circulates between the ink chamber of the subtank 7 and the ink-jet head 8. The four ink-jet heads 8 discharge the four color inks supplied from the subtank 7 onto the recording paper 200, while moving in the moving direction together with the carriage 6.

As depicted in FIG. 1, the conveying roller 4 is arranged on the upstream side (rear side) in the conveying direction with respect to the platen 2. The conveying roller 5 is arranged on the downstream side (front side) in the conveying direction with respect to the platen 2. The two conveying rollers 4 and 5 are synchronously driven by a motor (not depicted). The two conveying rollers 4 and 5 convey the recording paper 200 placed on the platen 2 in the conveying direction orthogonal to the moving direction. The printing apparatus 1 is provided with a controller 50. The controller 50 is provided with a CPU or a logic circuit (for example, FPGA), and a memory 55 such as a nonvolatile memory, a RAM, etc.; and the like. The controller 50 performs various kinds of control processings by reading and executing a program stored in a portable recording medium 501. The program to be read may be pre-installed in the memory 55. Further, the program may be downloaded through a network (not depicted) connected to a communication network (not depicted) and stored in the memory 55.

The controller 50 receives a print job and driving waveform data from an external device 100, and the controller 50 stores the print job and the driving waveform data in the memory 55. The controller 50 controls the driving of, for example, the ink discharge device 3 and the conveying roller 4 based on the print job and executes a printing processing. Note that the controller 50 may be arranged in the inside of the carriage 6.

Figure 2:
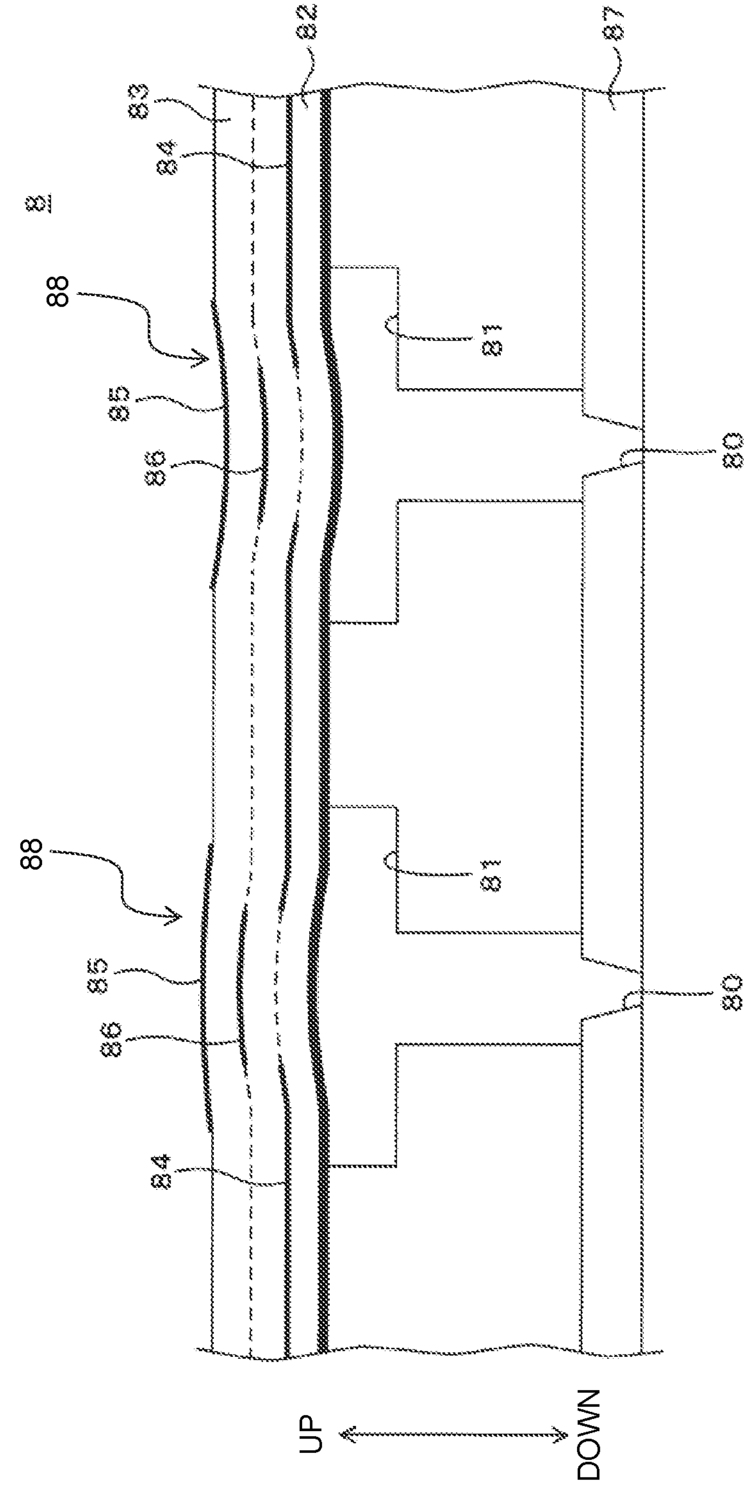
FIG. 2 is a partial enlarged cross-sectional view schematically depicting an ink-jet head.

FIG. 2 is a partial enlarged cross-sectional view schematically illustrating each of the four ink-jet heads 8. Each of the ink-jet heads 8 is provided with a plurality of pressure chambers 81. The plurality of pressure chambers 81 construct a plurality of pressure chamber arrays. A vibration plate 82 is formed on the upper side of the pressure chamber 81. A layered piezoelectric member (energy generating element, energy application element) 83 is formed on the upper side of the vibration plate 82. Note that the piezoelectric member 83 is an energy generating element. A first common electrode 84 is formed between the piezoelectric member 83 and the vibration plate 82 on the upper side of each of the plurality of pressure chambers 81.

A second common electrode 86 is provided on the inside of the piezoelectric member 83. The second common electrode 86 is arranged on the upper side of each of the pressure chambers 81 and on the upper side of the first common electrode 84. The second common electrode 86 is arranged at a position at which the second common electrode 86 does not face (is not opposed to) the first common electrode 84. An individual electrode 85 is formed on the upper surface of the piezoelectric member 83, at a location on the upper side of each of the plurality of pressure chambers 81. The individual electrode 85 vertically faces the first common electrode 84 and the second common electrode 86 with the piezoelectric member 83 intervened therebetween. The vibration plate 82, the piezoelectric member 83, the first common electrode 84, the individual electrode 85, and the second common electrode 86 construct an actuator 88. In the first embodiment, although the actuator 88 has a three-layer structure, the actuator 88 may have a two-layer structure. Although the actuator 88 is of the piezoelectric system, the actuator 88 may be of the Bubble Jet (trademark) system or of the electrostatic force system.

A nozzle plate 87 is provided under or below the respective pressure chambers 81. A plurality of nozzles 80, which vertically penetrate, are formed on the nozzle plate 87. Each of the plurality of nozzles 80 is arranged on the lower side of one of the plurality of pressure chambers 81. The plurality of nozzles 80 constitute a plurality of nozzle arrays which extend, respectively, along the pressure chamber arrays.

The first common electrode 84 is connected to a COM terminal, i.e., the ground in this embodiment. The second common electrode 86 is connected to a VCOM terminal. The VCOM voltage is higher than the COM voltage. The individual electrode 85 is connected to a switch group 54 (see FIG. 3). The High or Low voltage is applied to the individual electrode 85, which in turn deforms the piezoelectric member 83, and vibrates the vibration plate 82. The ink is discharged from the pressure chamber 81 via the nozzle 80 in accordance with the vibration of the vibration plate 82.

Figure 3:
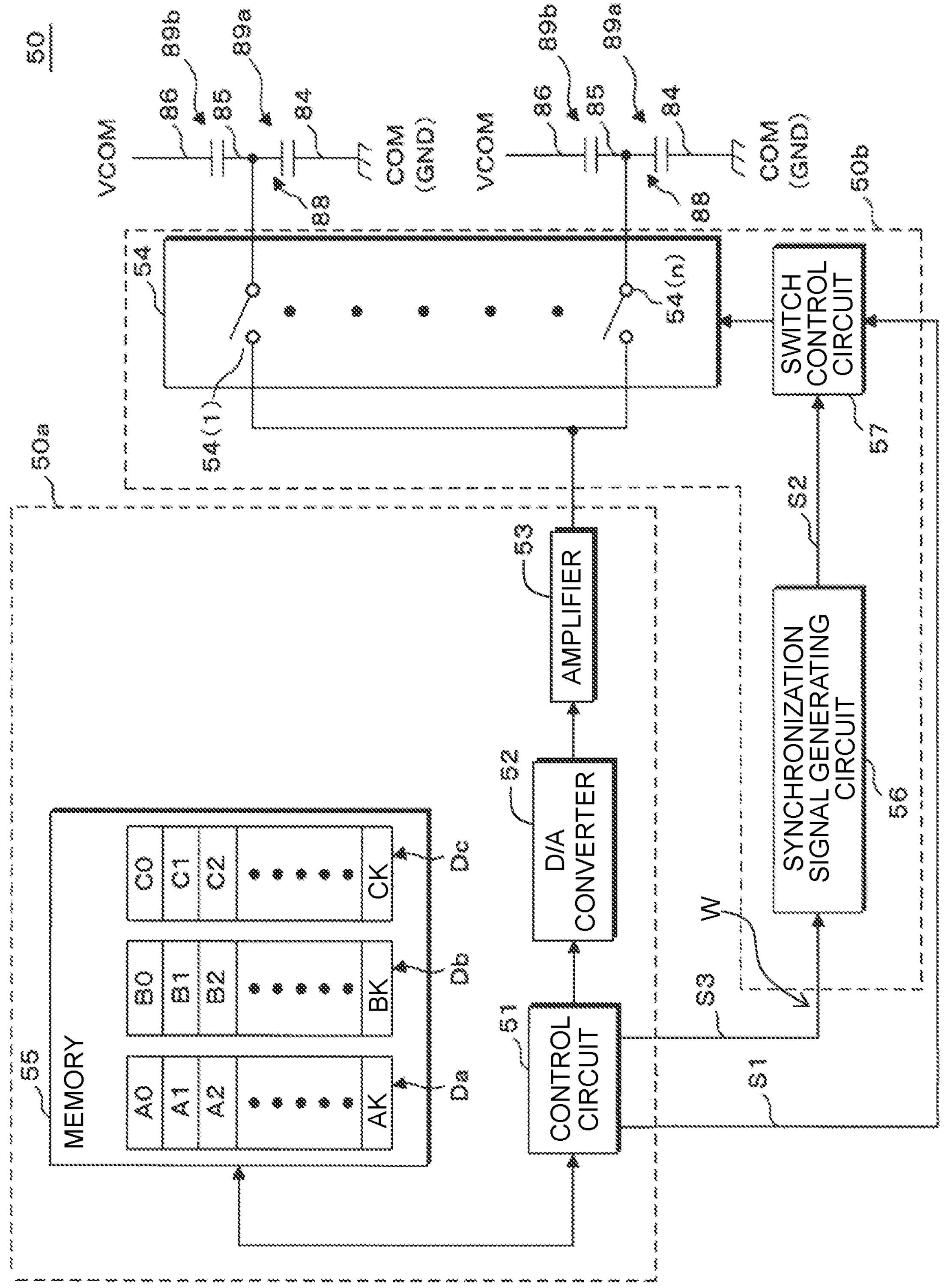
FIG. 3 is a block diagram of a controller.

FIG. 3 is a block diagram of the controller 50. The controller 50 is provided with a control circuit 51, a digital-analog converter (D/A convertor) 52, an amplifier 53, the switch group 54, the memory 55, a synchronization signal generating circuit 56, and a switch control circuit 57. Driving waveform data is stored in the memory 55. The driving waveform data is data which represents a voltage waveform to be applied to the individual electrode 85, that is a driving waveform for driving the actuator 88. The driving waveform data is quantized data. In this embodiment, driving waveform data Da, Db and Dc are stored in the memory 55. The number (quantity) of driving waveform data is not limited to or restricted by three, and may be two, or not less than four.

The digital-analog converter 52 converts a digital signal into an analog signal. The amplifier 53 amplifies the analog signal. The switch group 54 is provided with a plurality of n-th switches 54($n$) (n=1, 2, . . . N). The n-th switches 54($n$) are constructed, for example, by an analog switch IC. One end of each of the plurality of n-th switches 54($n$) is connected to the amplifier 53 via a common bus. The other end of each of the plurality of n-th switches 54($n$) is connected to the individual electrode 85 corresponding to one of the plurality of nozzles 80.

A first capacitor 89$a$ is constructed by the individual electrode 85, the first common electrode 84, and the piezoelectric member 83. A second capacitor 89$b$ is constructed by the individual electrode 85, the second common electrode 86, and the piezoelectric member 83.

Figure 4:
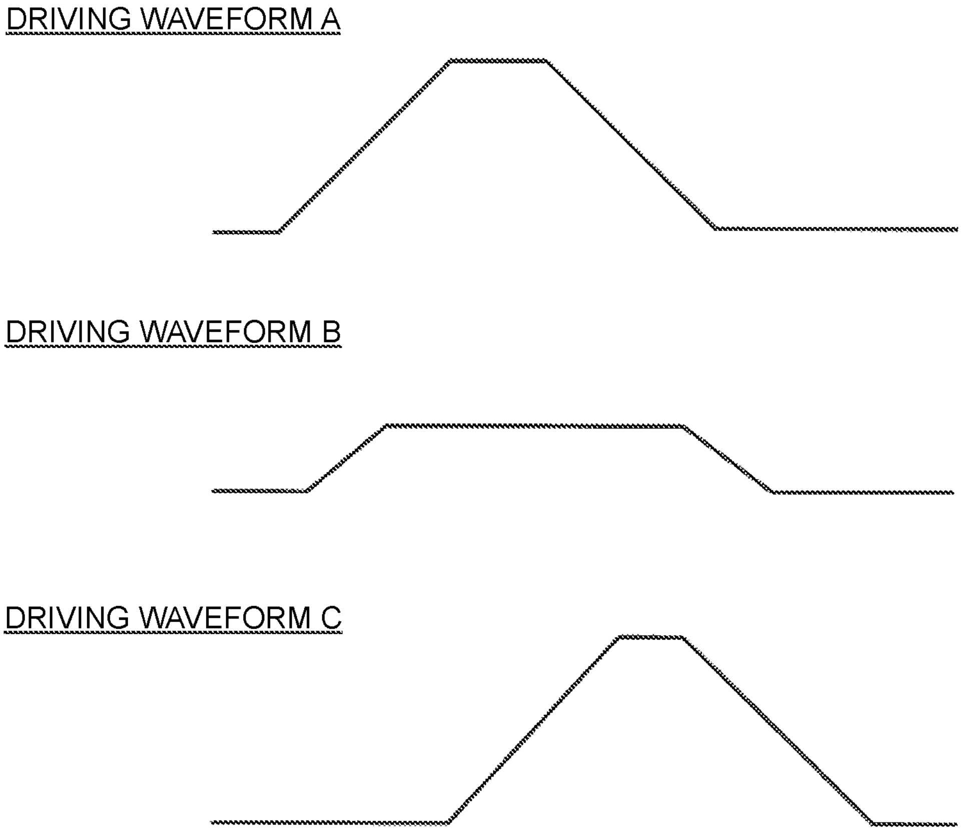
FIG. 4 is an explanatory view explaining examples of driving waveforms A, B and C.

FIG. 4 is an explanatory view explaining examples of driving waveforms A, B, and C. In FIG. 4, the right side indicates the past state as compared with the left side. This is applicable similarly also to FIG. 5 to FIG. 7. The driving waveform data Da is quantized data of the driving waveform A, the driving waveform data Db is quantized data of the driving waveform B, and the driving waveform data Dc is quantized data of the driving waveform C. The driving waveform data Da has quantized data Ak (k=0, 1, 2, . . . K), the driving waveform data Db has quantized data Bk (k=0, 1, 2, . . . K), and the driving waveform data Dc has quantized data Ck (k=0, 1, 2, . . . K).

Figure 5:
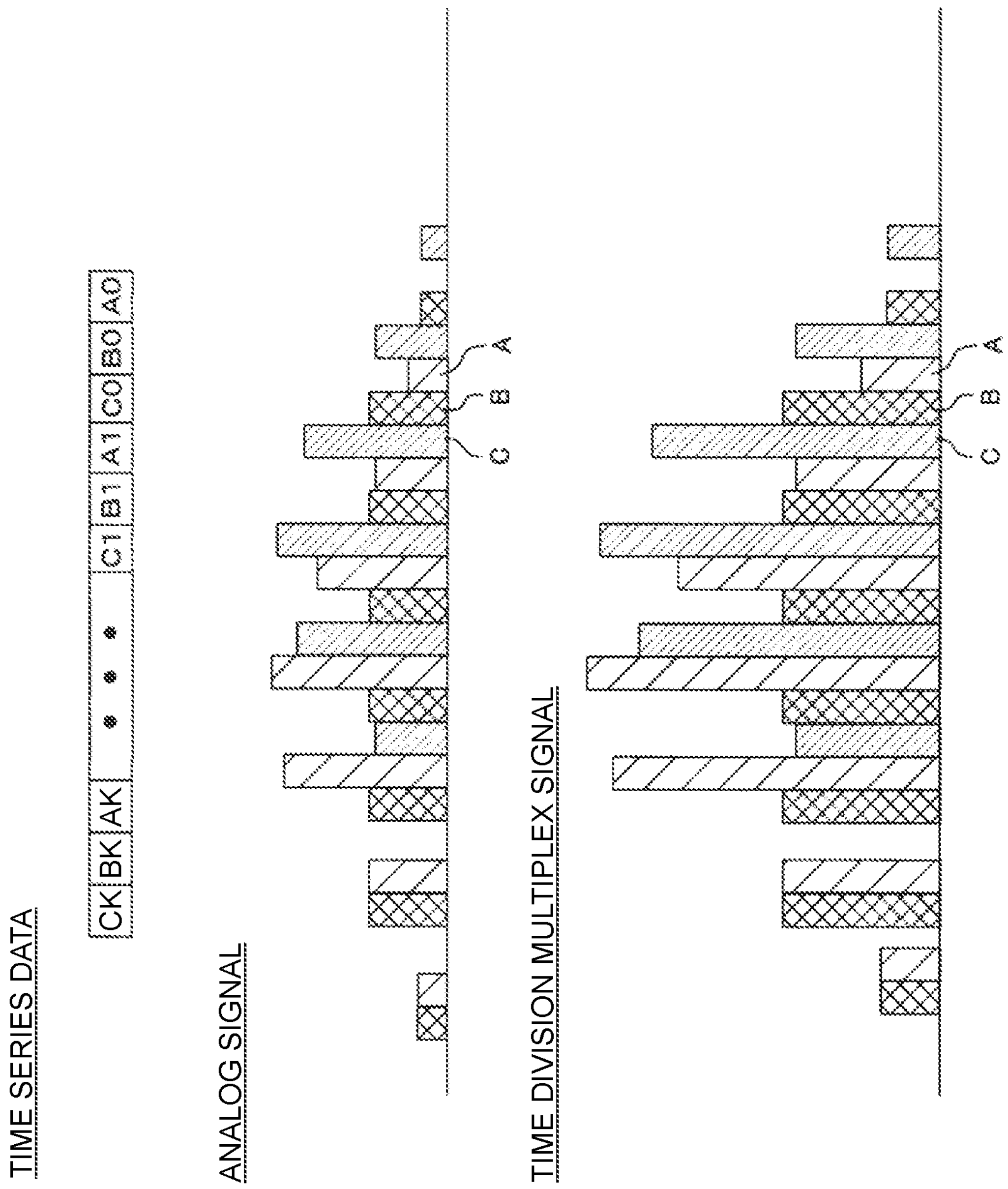
FIG. 5 is an explanatory view explaining examples of time series data, an analog signal and a time division multiplex signal.

FIG. 5 is an explanatory view explaining examples of time series data, an analog signal and a time division multiplex signal. In FIG. 5, references "A", "B" and "C" correspond to the driving waveforms A, B and C, respectively. In a case that the actuator 88 is to be driven, the control circuit 51 accesses the memory 55, obtains the driving waveform data Da, Db and Dc, and generates time series data. In the time series data, the data Ak, Bk and Ck are successively arranged while providing a time interval Δt therebetween; the data Ak, Bk and Ck are arranged in an order of A0, B0, C0, A1, B1, C1, . . . , AK, BK and CK. The time series data is a digital signal. Note that the time interval Δt is the reciprocal of a predetermined sampling frequency. The quantized data Ak, Bk and Ck are arranged in the order of A0, B0, C0, A1, B1, C1, . . . , AK, BK and CK, for every time (at a time interval) corresponding to the reciprocal of the predetermined sampling frequency. In other words, the data length of the quantized data Ak, Bk and Ck is not more than a length corresponding to the reciprocal of the predetermined sampling frequency. Further, the quantized data A0 is continuous with the quantized data B0, the quantized data B0 is continuous with the quantized data C0, and the quantized data C0 is continuous with the quantized data A1. In other words, the quantized data C0, other quantized data and any data of any other waveform are not present between the quantized data A0 and the quantized data B0. Further, the quantized data A0, other quantized data and any data of any other waveform are not present between the quantized data B0 and the quantized data C0. Furthermore, the quantized data B0, other quantized data and any data of any other waveform are not present between the quantized data C0 and the quantized data A1.

The control circuit 51 transmits the time series data to the digital-analog converter 52. As depicted in FIG. 5, the digital-analog converter 52 converts the time series data into an analog signal, and transmits the converted analog signal to the amplifier 53. The amplifier 53 amplifies the inputted analog signal, and transmits the amplified analog signal to the switch group 54. As depicted in FIG. 5, the analog signal amplified by the amplifier 53 constructs a time division multiplex signal. In the time division multiplex signal, it is assumed that the portion corresponding to the data Ak−1 is a first portion, the portion corresponding to the data Ak is a second portion, the portion corresponding to the data Bk−1 is a third portion, and the portion corresponding to the data Bk is a fourth portion. On this assumption, the third portion is present between the first portion and the second portion, and the second portion is present between the third portion and the fourth portion. Note that a similar relationship is also established between the data Ak and the data Ck, and a similar relationship is also established between the data Bk and the data Ck. In other words, the first portion is continuous with the third portion, the third portion is continuous with the second portion, and the second portion is continuous with the fourth portion. That is, the second portion, the fourth portion and other waveform are not present between the first portion and the third portion in the time division multiplex signal. Further, the first portion, the fourth portion and other waveform are not present between the third portion and the second portion in the time division multiplex signal. Further, the first portion, the third portion and other waveform are not present between the second portion and the fourth portion in the time division multiplex signal. The control circuit 51, the digital-analog converter 52, the amplifier 53 and the memory 55 construct a signal generating circuit (multiplexing circuit, multiplexer) 50*a*.

The control circuit 51 transmits a switch control signal S1 for controlling the opening and closing of the plurality of n-th switches 54(*n*) to the switch control circuit 57. Further, the control circuit 51 transmits a generation instruction signal S3 for instructing generation of a synchronization signal S2*a* corresponding to the driving waveform A, a synchronization signal S2*b* corresponding to the driving waveform B, and generation of a synchronization signal S2*c* corresponding to the driving waveform C to the synchronization signal generating circuit 56. Note that the three synchronization signals S2*a*, S2*b* and S2*c* may be simply expressed as a "synchronization signal S2" as well (see FIG. 3). In the first embodiment, a signal line W via which the generation instruction signal S3 is transmitted is a dedicated signal line via which only the generation instruction signal S3 is transmitted, and any other signals are not transmitted via the signal line W. An end of the signal line W is connected to the controlling circuit 51, and the other end of the signal line W is connected to the synchronization signal generating circuit 56. The synchronization signal generating circuit 56 generates the synchronization signal S2 and transmits the generated synchronization signal S2 to the switch control circuit 57. The switch control circuit 57 includes a counter synchronized with a counter of the control circuit 51. The switch control circuit 57 causes the switch control signal S1 to correspond with the synchronization signal S2 based on the counter, and transmits the switch control signal S1 and the synchronization signal S2 to the n-th switch 54 (*n*).

The switch control signal S1 includes first selection information indicating as to which one of the plurality of n-th switches 54(*n*) is to be selected, and second selection information indicating as to which one of the three synchronization signals S2*a*, S2*b* and S2*c* is to be selected. The first selection information and the second selection information are associated with each other.

Figure 6:
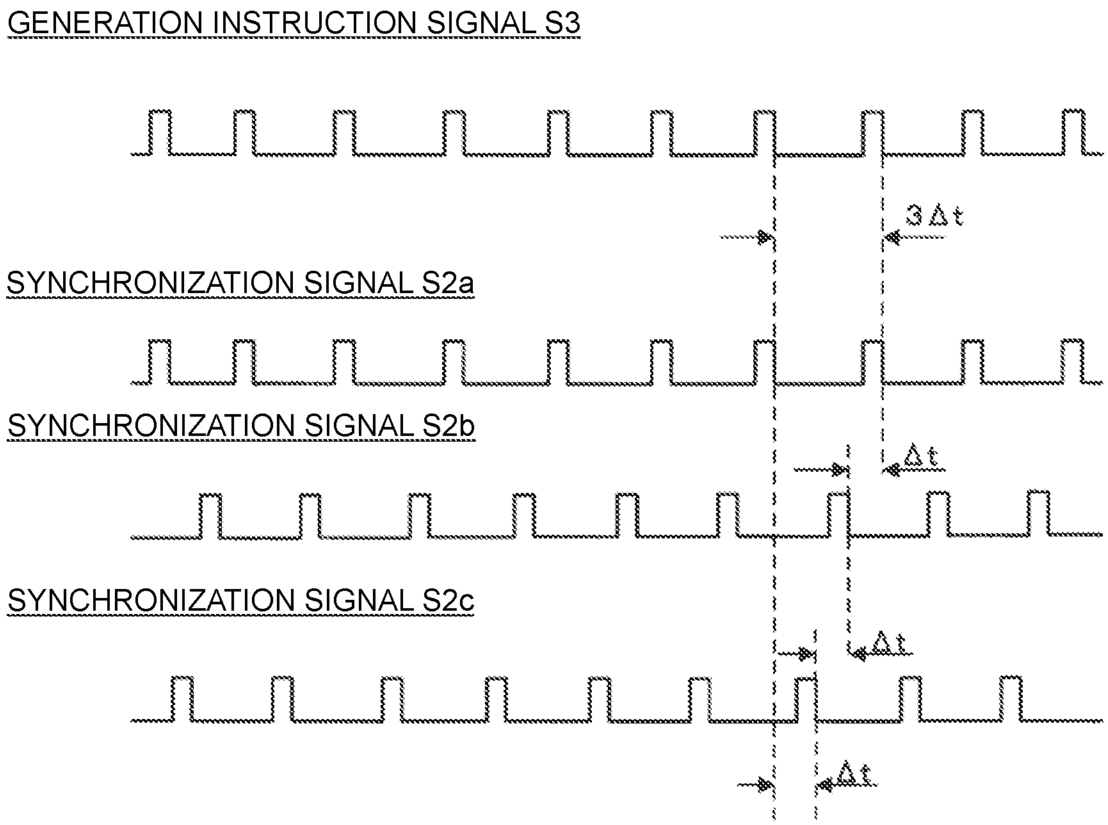
FIG. 6 is an explanatory view explaining the relationship between a generation instruction signal and synchronization signals.

FIG. 6 is an explanatory view explaining the relationship between a generation instruction signal S3 and synchronization signals S2*a*, S2*b* and S2*c*. The generation instruction signal S3 and the synchronization signals S2*a*, S2*b* and S2*c* are pulse waves.

The synchronization signal generating circuit 56 includes a counter synchronized with the counter of the control circuit 51, and generates the synchronization signals S2*a*, S2*b* and S2*c* from the generation instruction signal S3 based on the counter.

A time interval (pulse interval) between the rising edges (time points of the rising edges) of the pulse of the generation instruction signal S3 is 3Δt. The synchronization signal S2*b* is generated by delaying the rising edge (time point of the rising edge) of the generation instruction signal S3 by Δt, and the pulse interval of the generation instruction signal S3 and the pulse interval of the synchronization signal S2*b* are the same. The synchronization signal S2*c* is generated by delaying the rising edge of the generation instruction signal S3 by 2Δt, and the pulse interval of the generation instruction signal S3 and the pulse interval of the synchronization signal S2*c* are the same. The synchronization signal S2*a* is generated by delaying the rising edge of the generation instruction signal S3 by 3Δt, and the pulse interval of the generation instruction signal S3 and the pulse interval of the synchronization signal S2*a* are the same. That is, the generation instruction signal S3 and the synchronization signal S2*a* are similar signals.

Figure 7:
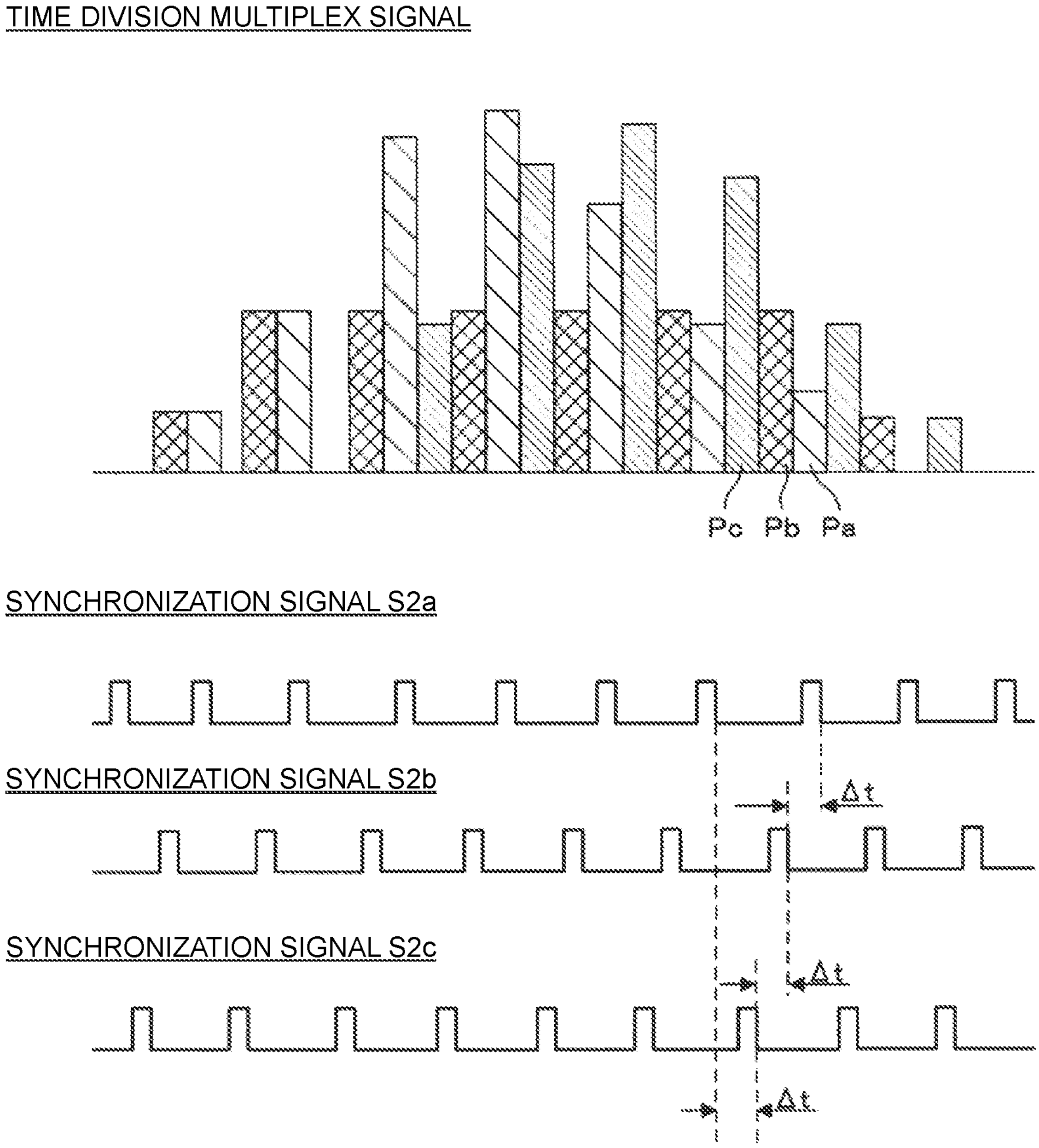
FIG. 7 is an explanatory view explaining the relationship between a time division multiplex signal and synchronization signals.

FIG. 7 is an explanatory view explaining the relationship between the time division multiple signal and synchronization signals S2*a*, S2*b* and S2*c*. As described above, the synchronization signals S2*a*, S2*b* and S2*c* are pulse waves. The time interval Δt is provided between the rising edge of the pulse of the synchronization signal S2*a* and the rising edge of the pulse of the synchronization signal S2*b*. Further, the time interval Δt is provided between the rising edge of the pulse of the synchronization signal S2*b* and the rising edge of the pulse of the synchronization signal S2*c*; and the time interval Δt is provided between the rising edge of the pulse of the synchronization signal S2*c* and the rising edge of the pulse of the synchronization signal S2*a*. As described above, the data Ak, Bk and Ck constructing the time series data are arranged in order, while providing the time interval Δt therebetween. Therefore, in a case that the time division multiplex signal is accessed at the rising edge of the pulse of the synchronization signal S2*a*, a driving waveform signal Pa corresponding to the data Ak and representing the driving waveform A can be obtained. In a case that the time division multiplex signal is accessed at the rising edge of the pulse of the synchronization signal S2*b*, a driving waveform signal Pb corresponding to the data Bk and representing the driving waveform B can be obtained. In a case that the time division multiplex signal is accessed at the rising edge of the pulse of the synchronization signal S2*c*, a driving waveform signal Pc corresponding to the data Ck and representing the driving waveform C can be obtained.

The switch group 54 opens and closes a selected n-th switch 54(*n*) at an opening and closing timing indicated by a selected synchronization signal among the synchronization signals S2*a* to S2*c*. In other words, the switch group 54 opens and closes the n-th switch 54(*n*) in accordance with a predetermined sampling frequency. The switch group 54, the synchronization signal generating circuit 56 and the switch control circuit 57 construct a separating circuit 50*b*. In other words, the switch group 54, the synchronization signal generating circuit 56 and the switch control circuit 57 are in the inside of the housing of the separating circuit 50*b*.

Figure 8:
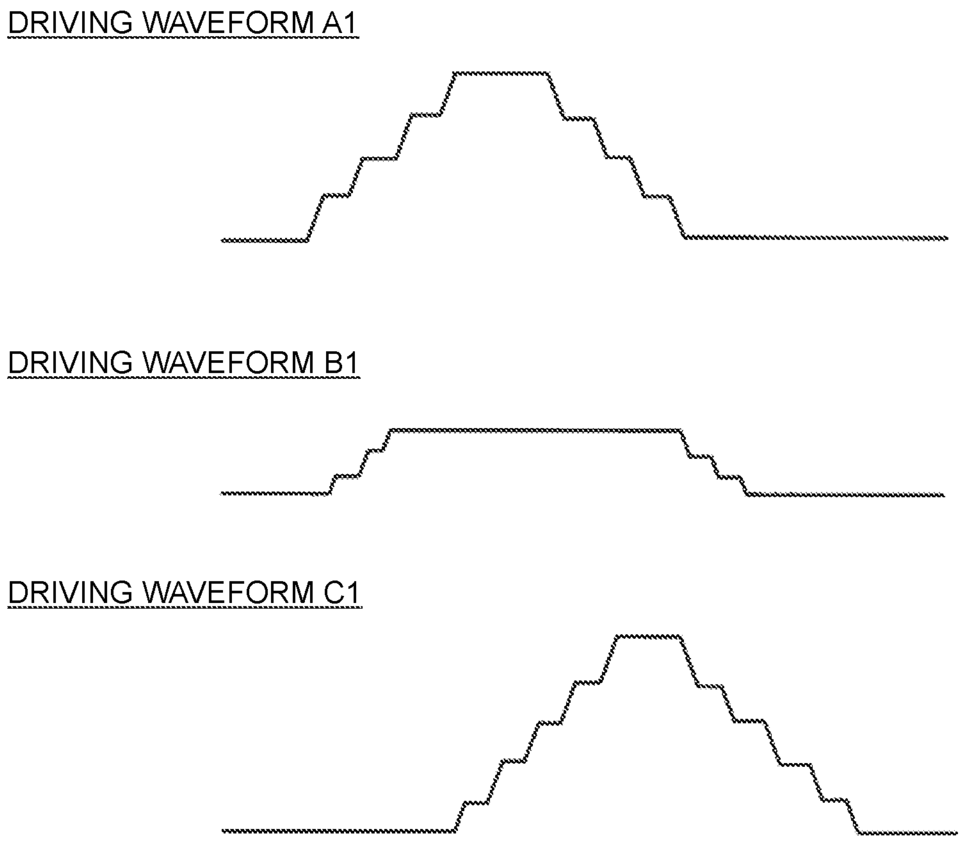
FIG. 8 is a schematic diagram of driving waveforms inputted into an actuator by opening and closing an n-th switch.

FIG. 8 is a schematic view of a driving waveform to be inputted into the actuator 88 by opening and closing the n-th switch 54(*n*). In a case that the synchronization signal S2*a* is selected and that the pulse of the synchronization signal S2*a* is in a high level interval, the switch group 54 closes the n-th switch 54(*n*); in a case that the synchronization signal S2*a* is selected and that the pulse of the synchronization signal S2*a* is in a low level interval, the switch group 54 opens the n-th switch 54(*n*). The electric charge, which is applied to the individual electrode 85 in a case that the n-th switch 54(*n*) is closed, is held by the first capacitor 89*a* and the second capacitor 89*b*. As depicted in FIG. 8, the driving waveform A1 is inputted into the actuator 88. In other words, based on the synchronization signal S2*a* the driving waveform signal Pa is separated from the time division multiplex signal in accordance with the predetermined sampling frequency, and the actuator 88 is driven by the driving waveform signal Pa.

In a case that the synchronization signal S2*b* is selected and that the pulse of the synchronization signal S2*b* is in the high level interval, the switch group 54 closes the n-th switch 54(*n*); in a case that the synchronization signal S2*b* is selected and that the pulse of the synchronization signal S2*b* is in the low level interval, the switch group 54 opens the n-th switch 54(*n*). The electric charge, which is applied to the individual electrode 85 in a case that the n-th switch 54(*n*) is closed, is held by the first capacitor 89*a* and the second capacitor 89*b*. As depicted in FIG. 8, the driving waveform B1 is inputted into the actuator 88. In other words, based on the synchronization signal S2*b* the driving waveform signal Pb is separated from the time division multiplex signal in accordance with the predetermined sampling frequency, and the actuator 88 is driven by the driving waveform signal Pb.

In a case that the synchronization signal S2*c* is selected and that the pulse of the synchronization signal S2*c* is in the high level interval, the switch group 54 closes the n-th switch 54(*n*); in a case that the synchronization signal S2*c* is selected and that the pulse of the synchronization signal S2*c* is in the low level interval, the switch group 54 opens the n-th switch 54(*n*). The electric charge, which is applied to the individual electrode 85 in a case that the n-th switch 54(*n*) is closed, is held by the first capacitor 89*a* and the second capacitor 89*b*. As depicted in FIG. 8, the driving waveform C1 is inputted into the actuator 88. In other words, based on the synchronization signal S2*c* the driving waveform signal Pc is separated from the time division multiplex signal in accordance with the predetermined sampling frequency, and the actuator 88 is driven by the driving waveform signal Pc.

The predetermined sampling frequency as described above is not less than a resonance frequency of the inkjet head 8, and is, for example, 24 kHz. Further, the inkjet head 8 includes the separating circuit 50*b* and an FPC (Flexible Printed Circuits, not depicted). For example, the separating circuit 50*b* is provided on the FPC connected to the inkjet head 8. Since the inkjet head 8 includes the separating circuit 50*b*, the driving waveform signal Pa, the driving waveform signal Pb, and the driving waveform signal Pc separated from the time division multiplex signal may be transmitted only using a signal line of a few centimeters. Therefore, blunting, etc., of the driving waveform signal Pa, the driving waveform signal Pb and the driving waveform signal Pc can be suppressed.

Figure 9:
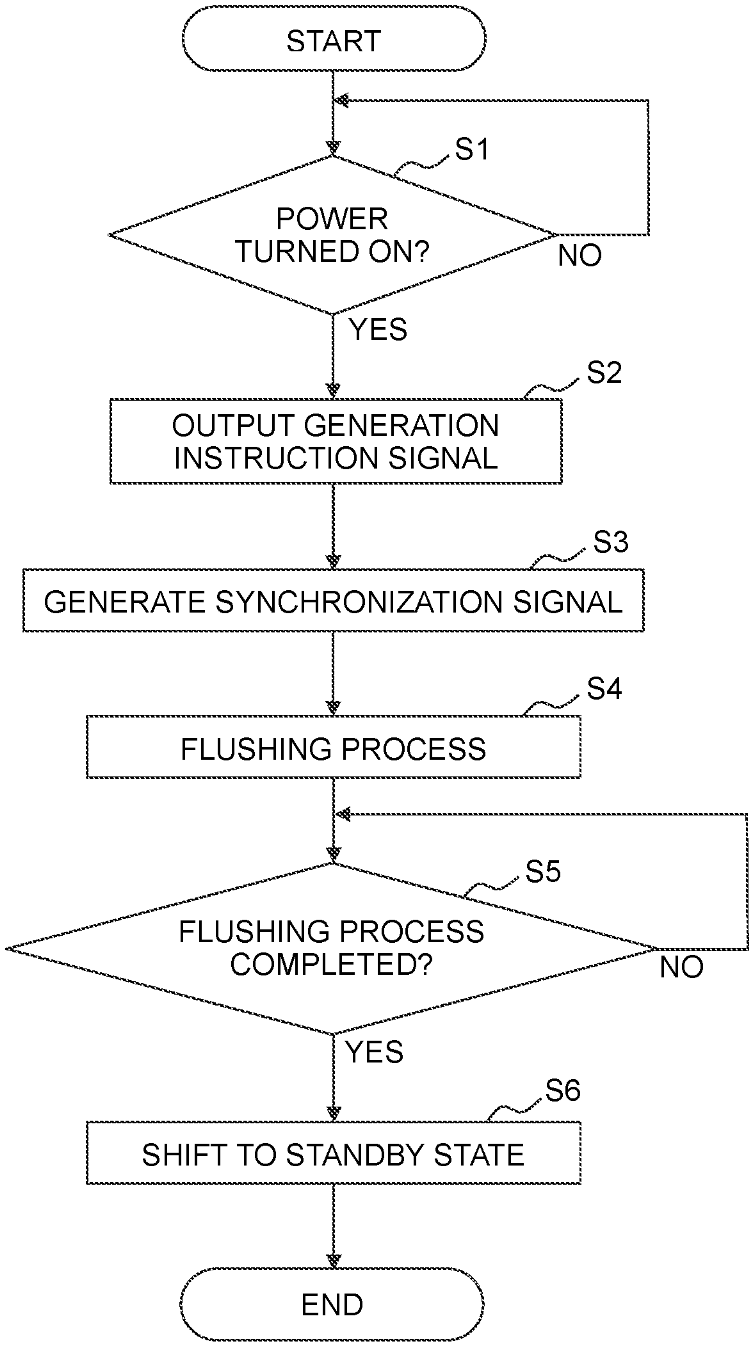

FIG. 9 is a flowchart explaining a processing by a controller 50 in a case that the power of the printing apparatus 1 is turned on. The controller 50 determines whether the power of the printing apparatus 1 is turned on. In a case that the power of the printing apparatus 1 is not turned on (step S1: NO), the controller 50 returns the processing to Step S1. In a case that the power of the printing apparatus is turned on (step S1: YES), the controller 50 transmits a generation instruction signal from the control circuit 51 to the synchronization signal generating circuit 56 (step S2). The controller 50 generates a synchronization signal in the synchronization signal generating circuit 56 (step S3) and executes a flushing processing (step S4). The flushing processing is a processing in which the ink(s) are discharged from the nozzles 80 for any purpose other than the purpose of the printing. The flushing processing is executed, for example, at the flushing receiver 21.

The controller 50 determines whether the flushing processing is completed (step S5). In a case that the flushing processing is not completed (step S5: NO), the controller 50 returns the processing to Step S5. In a case that the flushing processing is completed (step S5: YES), the controller 50 enters into to a standby state (step S6), and ends the processing. The controller 50 stands by in the standby state until, for example, a print job is received.

Figure 10A:
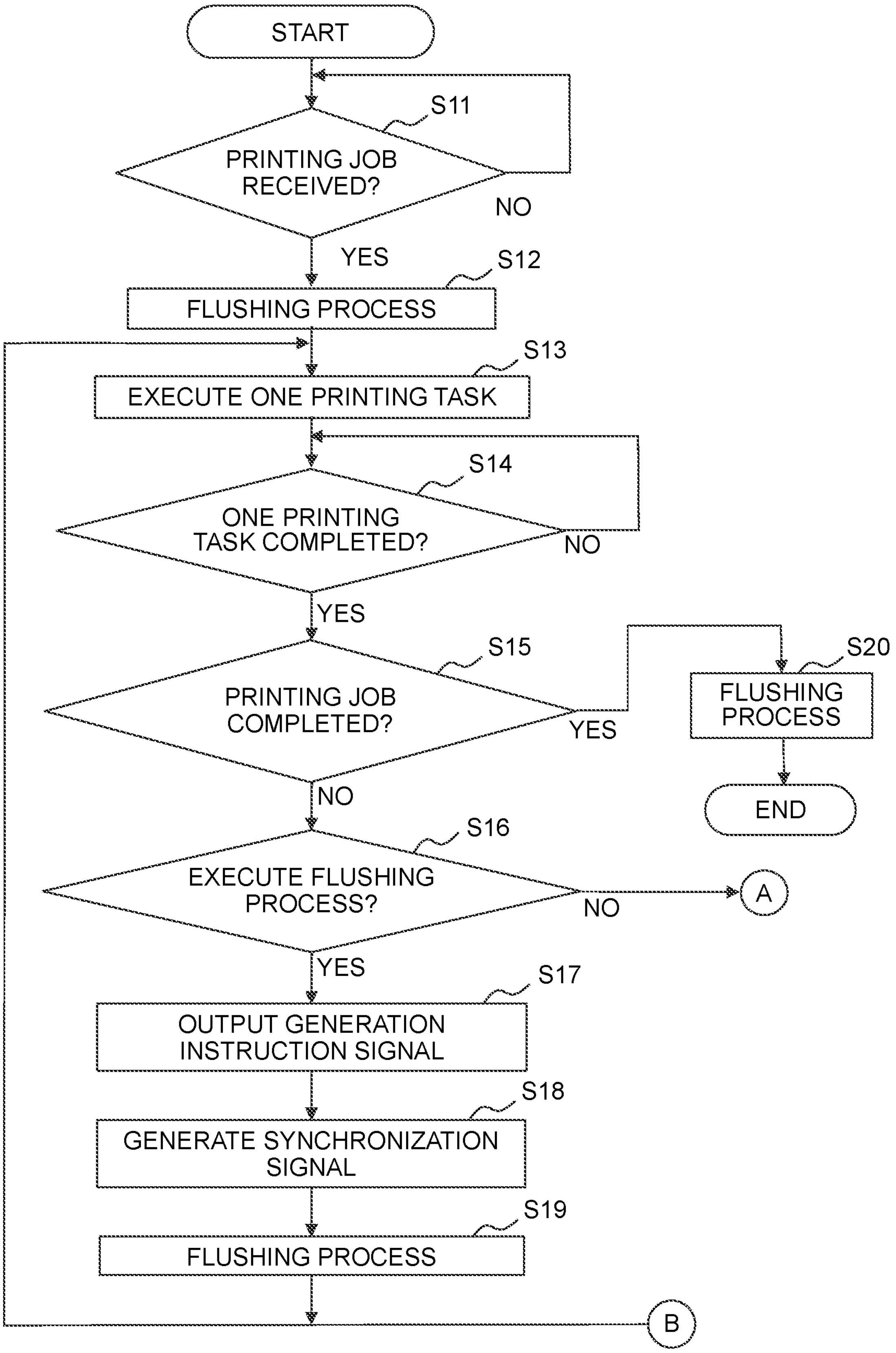
FIG. 10A and FIG. 10B are flow charts explaining a printing processing performed by the controller.
Figure 10B:
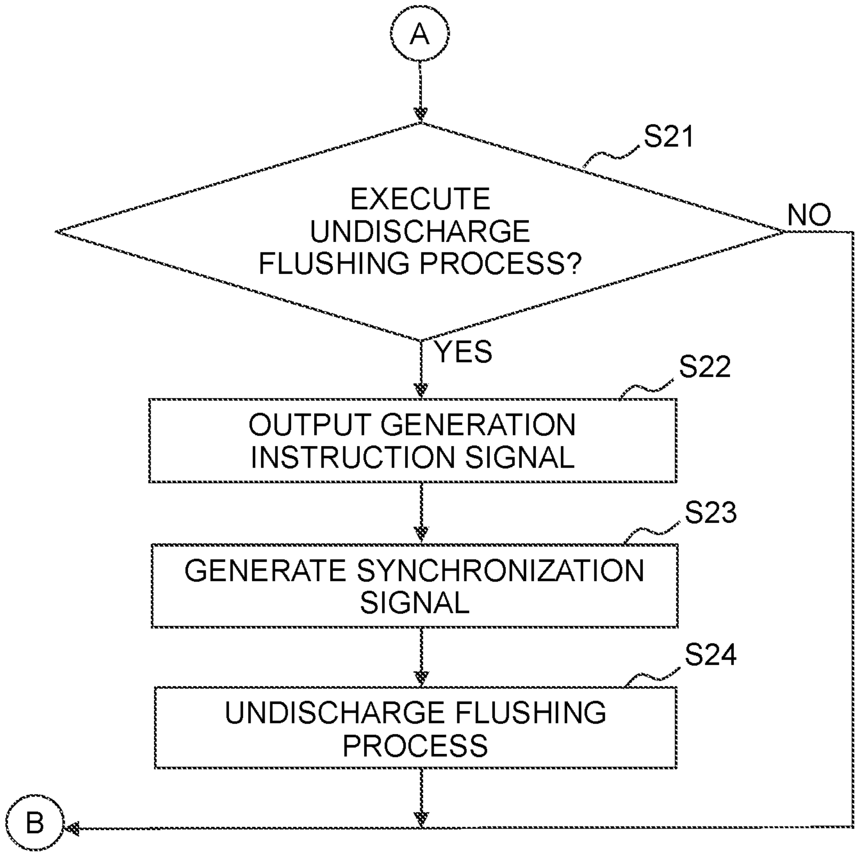

FIG. 10A and FIG. 10B are flow charts explaining the printing processing by the controller 50. The controller 50 determines whether or not the print job is received from the external device 100 (step S11). In a case that the print job is not received (step S11: NO), the controller 50 returns the processing to Step S11. In a case that the print job is received (step S11: YES), the controller 50 executes the flushing processing (step S12).

The controller 50 executes one printing task (step S13). The term "printing task" is a unit constructing the print job. Specifically, the printing task is a liquid discharging processing performed during a period of time in which the ink-jet head 8 is (being) moved rightward or leftward in an amount corresponding to a width in the left-right direction of the recording paper 200. Subsequently, the controller 50 determines whether or not one printing task is completed (step S14). Note that the carriage 6 performs one movement in one printing task. In a case that one printing task is not completed (step S14: NO), the controller 50 returns the processing to Step S14. In a case that one printing task is completed (step S14: YES), the controller 50 determines whether or not the print job is completed (step S15).

In a case that the print job is completed (step S15: YES), the controller 50 executes the flushing processing (step S20) and ends the printing processing. In a case that the print job is not completed (step S15: NO), the controller 50 determines whether or not it is a timing to execute the flushing processing (step S16). The flushing processing is periodically executed for the purpose of the maintenance of the nozzles 80. In a case that it is the timing to execute the flushing processing (step S16: YES), the controller 50 transmits the generation instruction signal from the controlling circuit 51 to the synchronization signal generating circuit 56 (step S17), generates the synchronization signal in the synchronization signal generating circuit 56 (step S18), and executes the flushing processing (step S19). After the controller 50 executes the flushing processing, the controller 50 returns the processing to Step S13. As a result, even in a case that the synchronization signal generated by the synchronization signal generating circuit 56 is deviated, the generation instruction signal is transmitted from the control circuit 51 to the synchronization signal generating circuit 56 at the timing of the flushing processing, thereby making it possible to correct the deviation of the synchronization signal generated by the synchronization signal generating circuit 56. In a case that it is not the timing to execute the flushing processing (step S16: NO), the controller 50 determines whether or not it is a timing to execute a undischarge flushing processing (step S21).

The undischarge flushing processing is a processing to be performed in order to prevent the nozzles 80 from drying without performing the discharge of the ink. In particular, the undischarge flushing processing is a processing in which the piezoelectric member 83 is slightly deformed to vibrate or shake the surface (meniscus) of the ink. For example, the undischarge flushing processing is executed in the cap 20. The undischarge flushing is periodically executed. In a case that it is the timing to execute the undischarge flushing processing (step S21: YES), the controller 50 transmits the generation instruction signal from the control circuit 51 to the synchronization signal generating circuit 56 (step S22), generates the synchronization signal in the synchronization signal generating circuit 56 (step S23), and executes the undischarge flushing processing (step S24). In Step S24, the controller 50 supplies a driving waveform corresponding to the undischarge flushing processing to the individual electrode 85. After the controller 50 executes the undischarge flushing processing, the controller 50 returns the processing to Step S13. As a result, even in a case that the synchronization signal generated by the synchronization signal generating circuit 56 is deviated, the generation instruction signal is transmitted from the control circuit 51 to the synchronization signal generating circuit 56 at the timing of the undischarge flushing processing, thereby making it possible to correct the deviation of the synchronization signal generated by the synchronization signal generating circuit 56. In a case that it is not the timing to execute the undischarge flushing processing (step S21: NO), the controller 50 returns the processing to Step S13.

The controller 50 may perform the generation of the time division multiplex signal and the separation of the driving waveform signal at either one of the time of executing the flushing processing (steps S4, S12, S19, S20) and the time of executing the undischarge flushing processing (step S24). That is, the generation of the time division multiplex signal and the separation of the driving waveform signal may be performed in a case that the actuator 88 is (being) driven.

Second Embodiment

Figure 11:
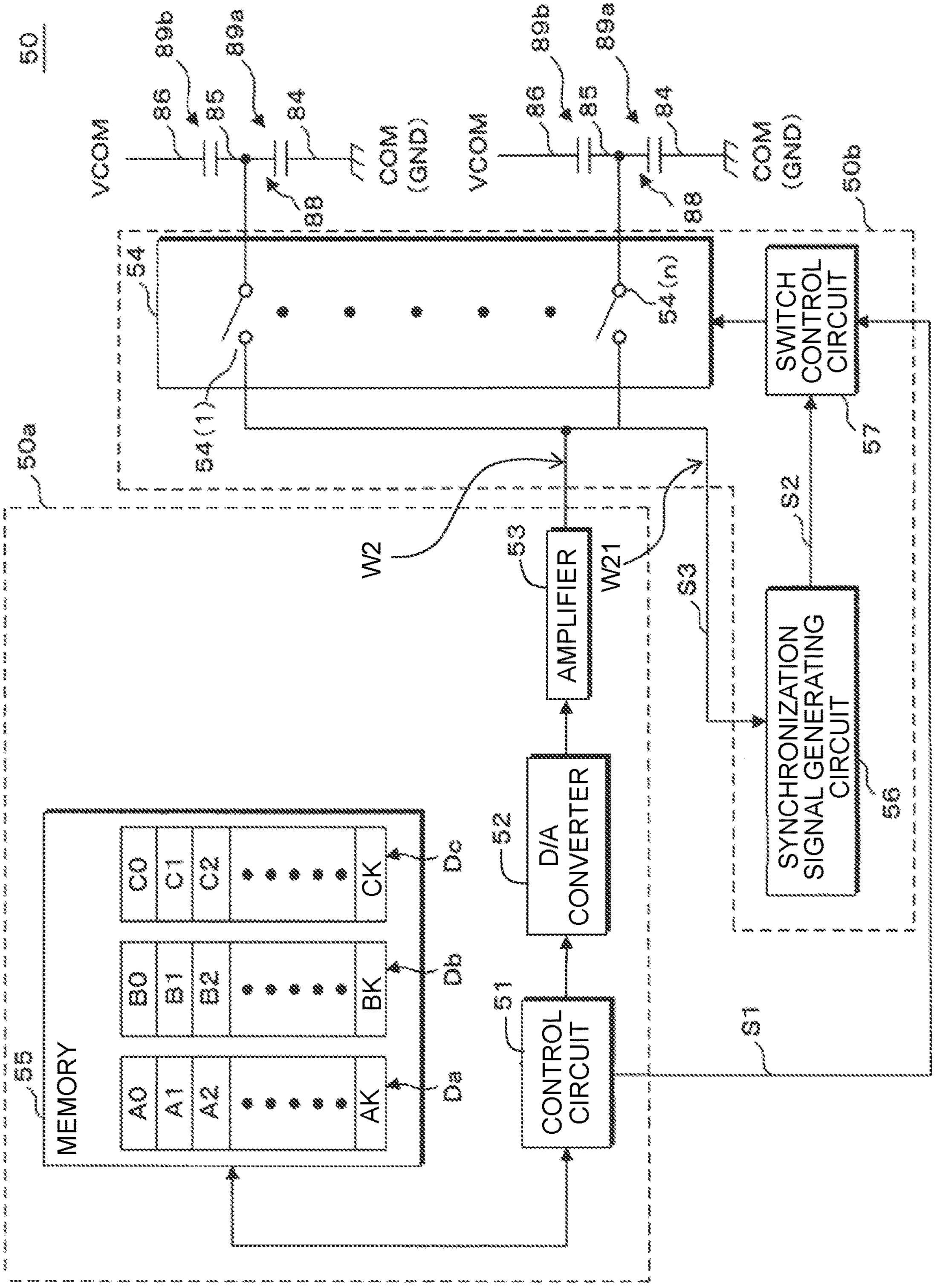
FIG. 11 is a block diagram of a controller.

A second embodiment of the present disclosure will be explained below, on the basis of the drawing which depicts a printing apparatus 1 according to the second embodiment. Constitutive components according to the second embodiment, which are the same as or equivalent to the constitutive components according to the first embodiment, are designated by the same reference numerals as those of the first embodiment, and any detailed explanation will be omitted. FIG. 11 is a block diagram of a controller 50 according to the second embodiment.

In the controller 50 according to the first embodiment, the signal line W for transmitting the generation instruction signal S3 is the dedicated line which transmits only the generation instruction signal S3 and does not transmit any other signals. However, the controlling circuit 51 may transmit the generation instruction signal S3 to the synchronization signal generating circuit 56, by using a signal line for transmitting the time division multiplex signal. That is, as depicted in FIG. 11, the time division multiplex signal and the generation instruction signal S3 are transmitted by sharing a single signal line via the digital-analog converter 52 and the amplifier 53. The amplifier 53 and the switch group 54 are connected by a signal line W2. A signal line W21 branched from the signal line W2 is connected to the synchronization signal generating circuit 56. In this case, the generation instruction signal S3 is transmitted from the control circuit 51 to the synchronization signal generating circuit 56 during a period of time in which the time division multiplex signal is not (being) transmitted.

Third Embodiment

Figure 12:
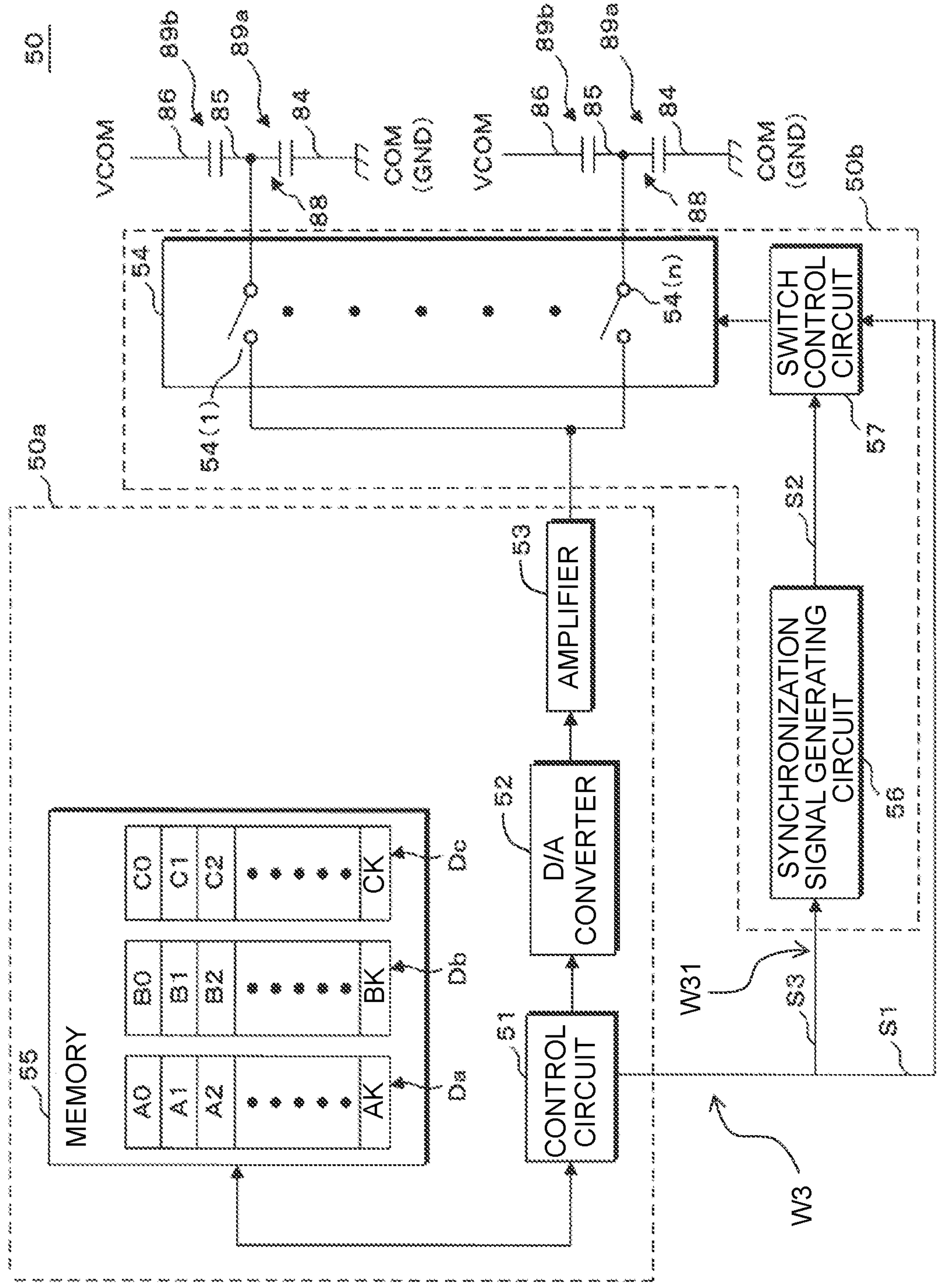
FIG. 12 is a block diagram of a controller.

A third embodiment of the present disclosure will be explained below on the basis of the drawing which depicts a printing apparatus 1 according to the third embodiment. Constitutive components according to the third embodiment, which are the same as or equivalent to the constitutive components according to the first embodiment, are designated by the same reference numerals as those of the first embodiment, and any detailed explanation will be omitted. FIG. 12 is a block diagram of a controller 50 according to the third embodiment.

In the controller 50 according to the first embodiment, the signal line W for transmitting the generation instruction signal S3 is the dedicated line which transmits only the generation instruction signal S3 and does not transmit any other signals. However, the controlling circuit 51 may transmit the generation instruction signal S3 to the synchronization signal generating circuit 56, by using a signal line for transmitting the switch control signal S1. That is, as depicted in FIG. 12, the switch control signal S1 and the generation instruction signal S3 are transmitted by sharing a single signal line. The control circuit 51 and the switch controlling circuit 57 are connected by a signal line W3. A signal line W31 branched from the signal line W3 is connected to the synchronization signal generating circuit 56. In this case, the generation instruction signal S3 is transmitted from the control circuit 51 to the synchronization signal generating circuit 56 during a period of time in which the switch control signal S1 is not (being) transmitted.

Fourth Embodiment

Figure 13:
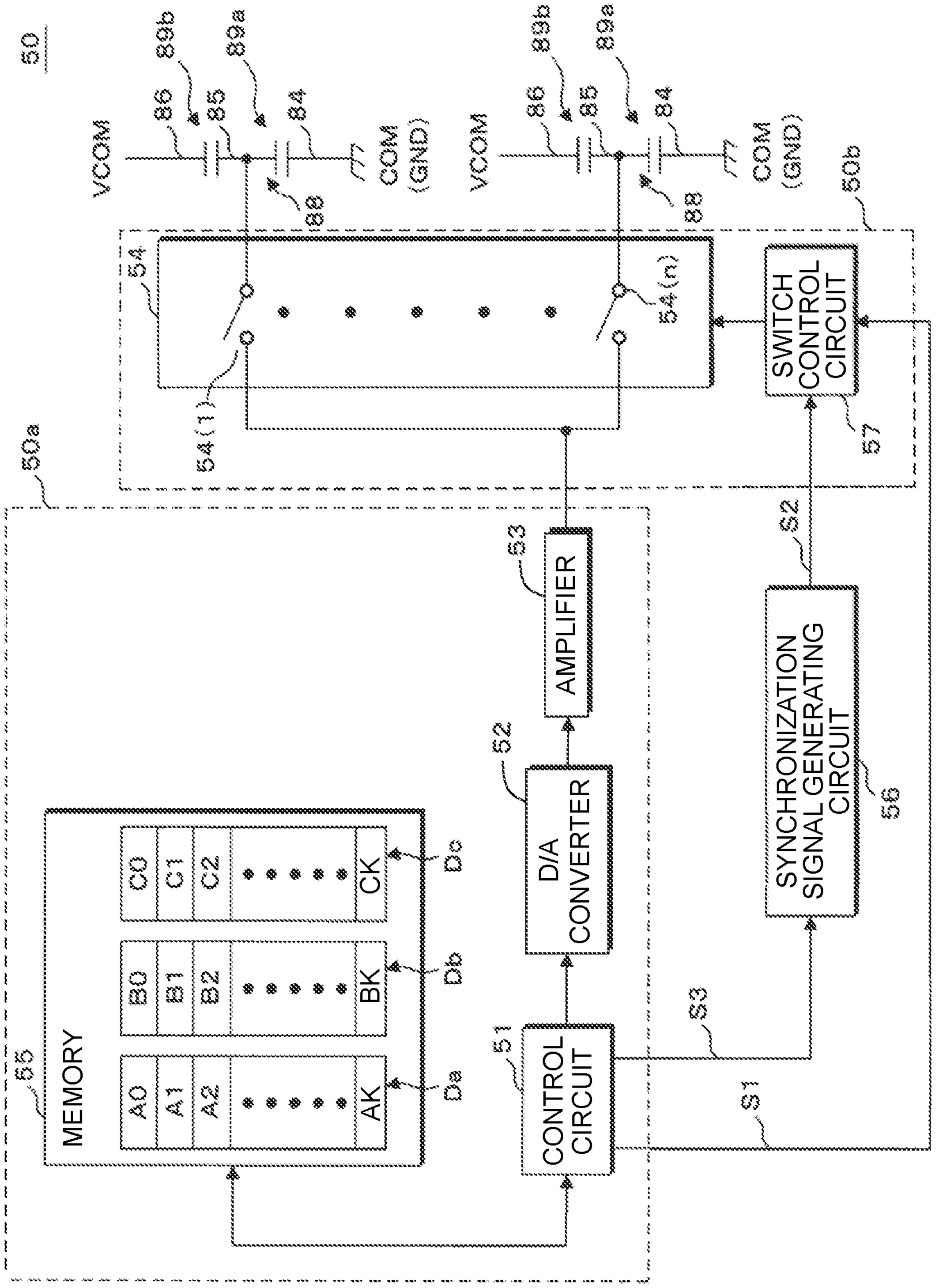
FIG. 13 is a block diagram of a controller.

A fourth embodiment of the present disclosure will be explained below on the basis of the drawing which depicts a printing apparatus 1 according to the fourth embodiment. Constitutive components according to the fourth embodiment, which are the same as or equivalent to the constitutive components according to the first embodiment, are designated by the same reference numerals as those of the first embodiment, and any detailed explanation will be omitted. FIG. 13 is a block diagram of a controller 50 according to the fourth embodiment.

In the controller 50 according to the first embodiment, the synchronization signal generating circuit 56 is arranged in the inside of the housing of the separating circuit 50*b*, but the synchronization signal generating circuit 56 may be arranged at the outside of the housing of the separating circuit 50*b* as depicted in FIG. 13. In other words, the switch group 54 and the switch control circuit 57 are in the inside of the housing of the separating circuit 50*b*, whereas the synchronization signal generating circuit 56 is not in the inside of the housing of the separating circuit 50*b* and has a housing different from that of the separating circuit 50*b*. In this case, the synchronization signal generating circuit 56 may be provided on the carriage 6 (see FIG. 1). More specifically, since the separating circuit 50*b* is provided on the FPC, it can be said that the separating circuit 50*b* is provided on the carriage 6 (see FIG. 1), and the housing of the synchronization signal generating circuit 56 is also provided on the FPC on which the separating circuit 50*b* is provided. Further, it is allowable that the housing of the synchronization signal generating circuit 56 is not provided on the FPC on which the separating circuit 50*b* is provided, under a condition that the housing of the synchronization signal generating circuit 56 is directly or indirectly supported by the housing of the carriage 6.

Fifth Embodiment

Figure 14A:
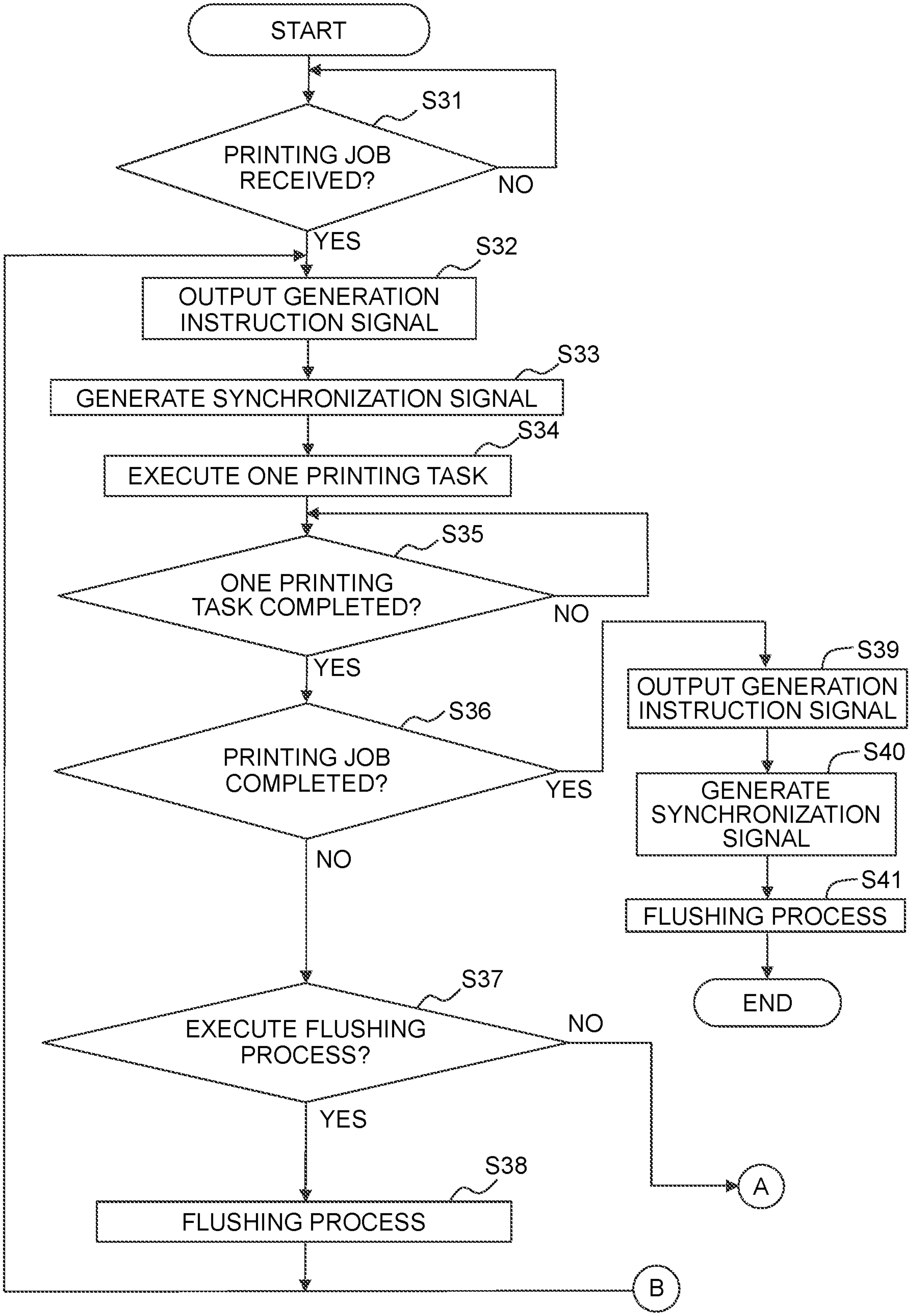
FIG. 14A and FIG. 14B are flow charts explaining the printing processing performed by a controller.
Figure 14B:
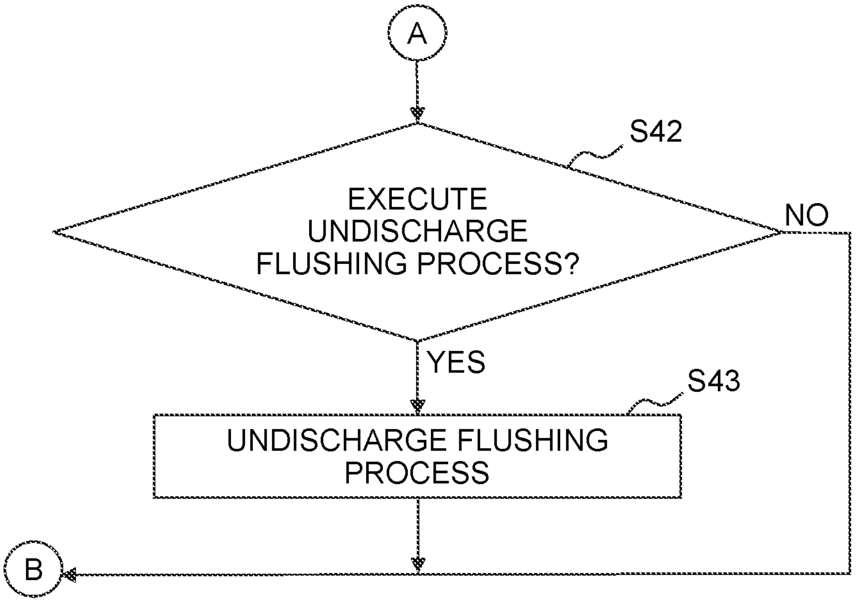

A fifth embodiment of the present disclosure will be explained below on the basis of the drawing which depicts a printing apparatus 1 according to the fifth embodiment. Any detailed explanation on processes according to the fifth embodiment, which are the same as or equivalent to the processes according to the first embodiment, will be omitted. FIG. 14A and FIG. 14B are flowcharts explaining a printing processing by the controller 50 according to the fifth embodiment.

In the first embodiment, the controller 50 transmits the generation instruction signal from the control circuit 51 to the synchronization signal generating circuit 56 at the flushing processing execution timing or at the undischarge flushing processing execution timing during printing, and generates the synchronization signal in the synchronization signal generating circuit 56. However, the timing of performing the transmitting of the generation instruction signal and the generation of the synchronization signal is not limited to this. It is allowable, for example, to set the above-described timing before the execution of one print task or after the completion of the print job.

As depicted in FIG. 14A and FIG. 14B, the controller 50 determines whether or not a print job is received from the external device 100 (step S31). In a case that the print job is not received (step S31: NO), the controller 50 returns the processing to Step S31. In a case that the print job is received (step S31: YES), the control device 50 transmits the generation instruction signal from the control circuit 51 to the synchronization signal generating circuit 56 (step S32). The controller 50 generates the synchronization signal in the synchronization signal generating circuit 56 (step S33) and executes one printing task (step S34).

Next, the controller 50 determines whether or not one printing task is completed (step S35). In a case that one printing task is not completed (step S35: NO), the controller 50 returns the processing to Step S35. In a case that one printing task is completed (step S35: YES), the controller 50 determines whether or not the print job is completed (step S36).

In a case that the print job is completed (step S36: YES), the controller 50 transmits the generation instruction signal from the control circuit 51 to the synchronization signal generating circuit 56 (step S39). The controller 50 generates the synchronization signal in the synchronization signal generating circuit 56 (step S40), executes the flushing processing (step S41), and ends the printing processing. In a case that the print job is not completed (step S36: NO), the controller 50 determines whether or not it is the timing to execute the flushing processing (step S37). In a case that it is the timing to execute the flushing processing (step S37: YES), the controller 50 executes the flushing processing (step S38) and returns the processing to Step S32. In a case that it is not the timing to execute the flushing processing (step S37: NO), the controller 50 determines whether or not it is the timing to execute the undischarge flushing processing (step S42).

In a case that it is the timing to execute the undischarge flushing processing (step S42: YES), the controller 50 executes the undischarge flushing processing (step S43), and returns the processing to Step S32. In a case that it is not the timing to execute the undischarge flushing processing (step S42: NO), the controller 50 returns the processing to Step S32.

Sixth Embodiment

Figure 15:
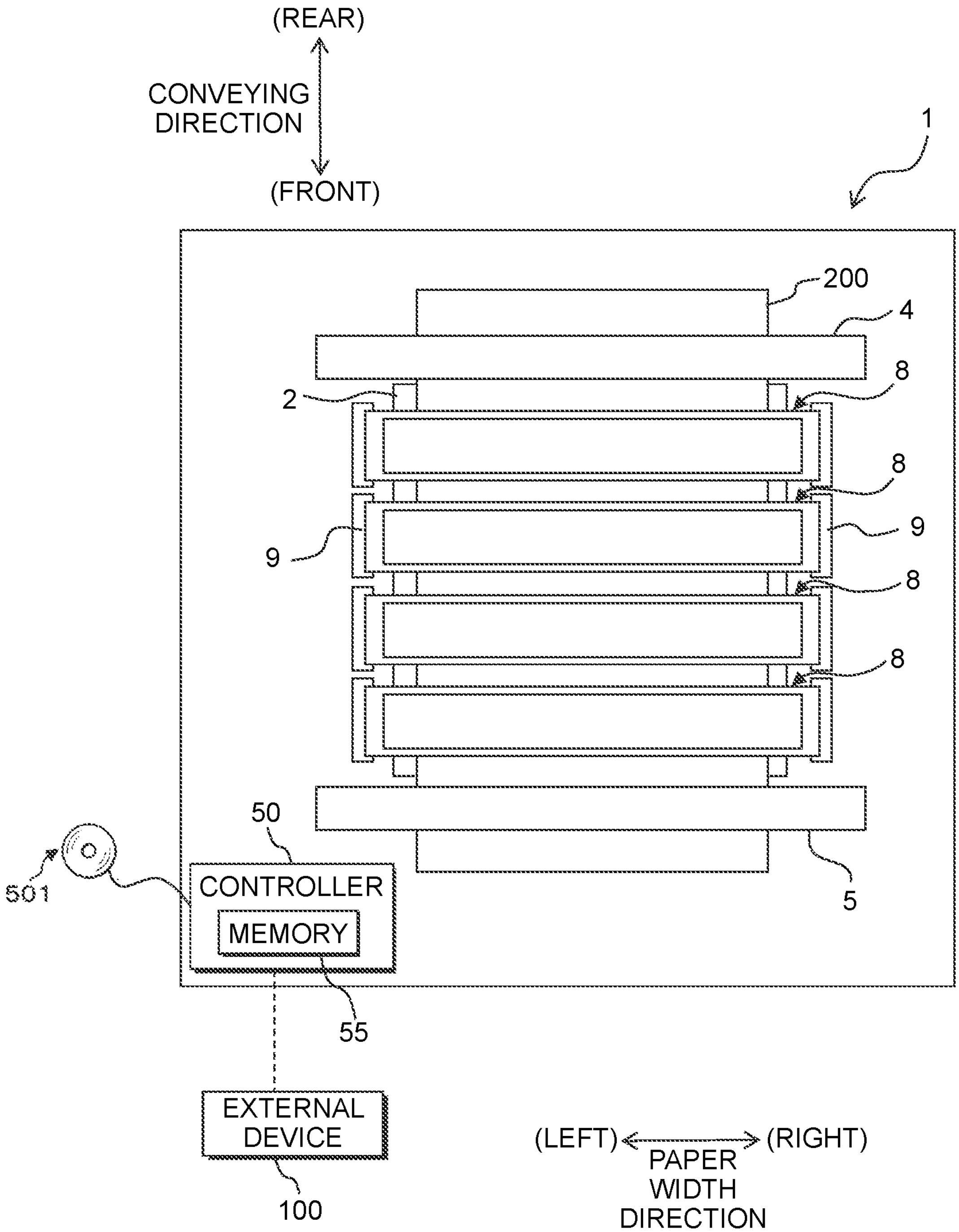
FIG. 15 is a plan view schematically depicting a printing apparatus.
Figure 16:
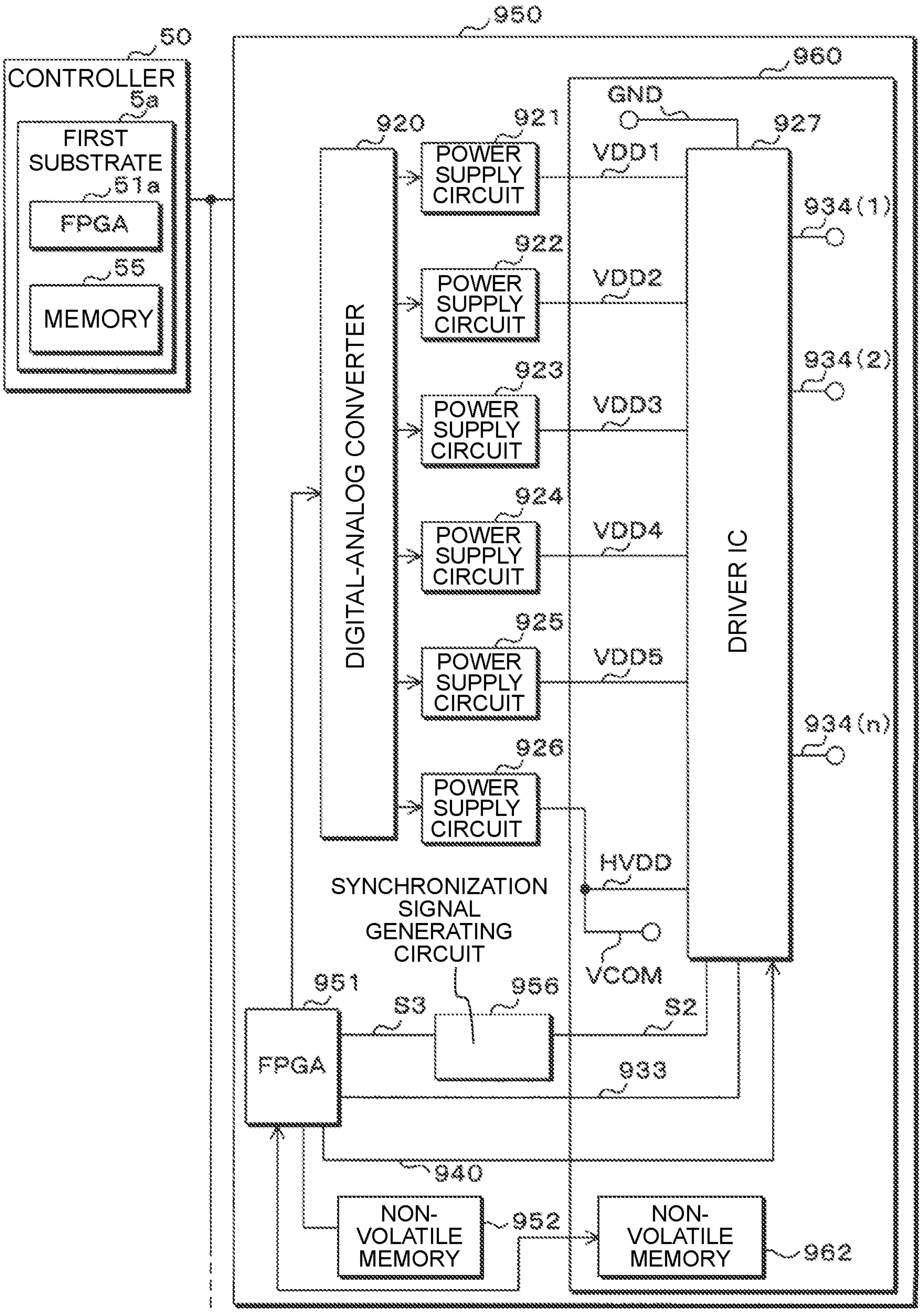
FIG. 16 is a block diagram of an example of the configuration of a second substrate provided on a head unit and a flexible circuit board connected to the second substrate.

A sixth embodiment of the present disclosure will be explained below on the basis of the drawings which depict a printing apparatus 1 according to the sixth embodiment. Constitutive components according to the sixth embodiment, which are the same as or equivalent to the constitutive components according to the first embodiment, are designated by the same reference numerals as those of the first embodiment, and any detailed explanation will be omitted. FIG. 15 is a plan view schematically illustrating the printing apparatus 1 according to the sixth embodiment. FIG. 16 is a block diagram of an example of the configuration of a second substrate 950 provided on a head unit and a flexible circuit board 960 connected to the second substrate 950 according to the sixth embodiment.

The printing apparatus 1 in each of the above-described embodiments is a serial head type printing apparatus in which the inkjet head 8 is moved by the carriage 6. It is allowable, however, that the printing apparatus 1 is a line head type printing apparatus which performs printing in a state that the inkjet head 8 is fixed. As depicted in FIG. 15, the printing apparatus 1 according to the sixth embodiment includes a plurality of pieces of a head bar 9 configured to hold the inkjet head 8. The inkjet head 8 according to the sixth embodiment includes a plurality of head units (not depicted), and each of the plurality of head units includes the second substrate 950 and the flexible circuit board 960 as depicted in FIG. 16. One piece of the second substrate 950 and one piece of the flexible circuit board 960 are provided corresponding to each of the plurality of head units. For convenience, in FIG. 16, one second substrate 950 and one flexible circuit board 960 are depicted.

The second substrate 950 includes a FPGA 951 as a controller, a non-volatile memory 952 such as an EEPROM, a digital-analog converter (D/A converter) 920, a first power supply circuit 921, a second power supply circuit 922, a third power supply circuit 923, a fourth power supply circuit 924, a fifth power supply circuit 925, a sixth power supply circuit 926, a synchronization signal generating circuit 956, etc. Further, the flexible circuit board 960 includes a non-volatile memory 962 such as an EEPROM, a driver IC 927, etc. Note that the separating circuit is constructed of the driver IC 927.

Under the control of a FPGA 51*a* provided on a first substrate 5*a* of the controller 50, the FPGA 951 transmits a time division multiplex signal, which is generated by the FPGA 51*a* by reading the driving waveform data from the memory 55 and which is transmitted to the FPGA 951, to the driver IC 927 via a signal line 933. That is, the signal generating circuit (multiplexing circuit, multiplexer) is constructed of the FPGA 51*a* and the memory 55. Further, the FPGA 951 transmits the generation instruction signal S3 to the synchronization signal generating circuit 956, and the synchronization signal generating circuit 956 transmits the synchronization signal S2 to the driver IC 927.

The FPGA 951 transmits a setting signal, which is an analog signal for setting the output voltage of each of the first power supply circuit 921 to the sixth power supply circuit 926, via the digital-analog converter 920 under the control of FPGA 51*a* provided on the first substrate 5*a* of the controller 50. Each of the power supply circuits 921 to 926 outputs an output voltage designated by the setting signal to the driver IC 927 via one of wirings VDD1 to VDD5 and a wiring HVDD.

The FPGA 951 transmits, via a control line 940 to the driver IC 927, a control signal for selecting the power supply circuit and a synchronization signal S2 used for generating a driving signal to be transmitted to each of signal lines 934(*n*) (n=1, 2, . . . N). The driver IC 927 transmits the driving signal to the individual electrode 85 (see FIG. 2) via each of the signal lines 934(*n*) in accordance with the control signal.

In a case that the synchronization signal generating circuit 956 is arranged at the outside of the separating circuit (driver IC 927) as depicted in FIG. 16, the synchronization signal generating circuit 956 may be provided on the head bar 9. Specifically, the synchronization signal generating circuit 956 may include a housing different from the housing of the driver IC, and the housing of the synchronization signal generating circuit 956 may be provided on the head bar 9.

Seventh Embodiment

Figure 17:
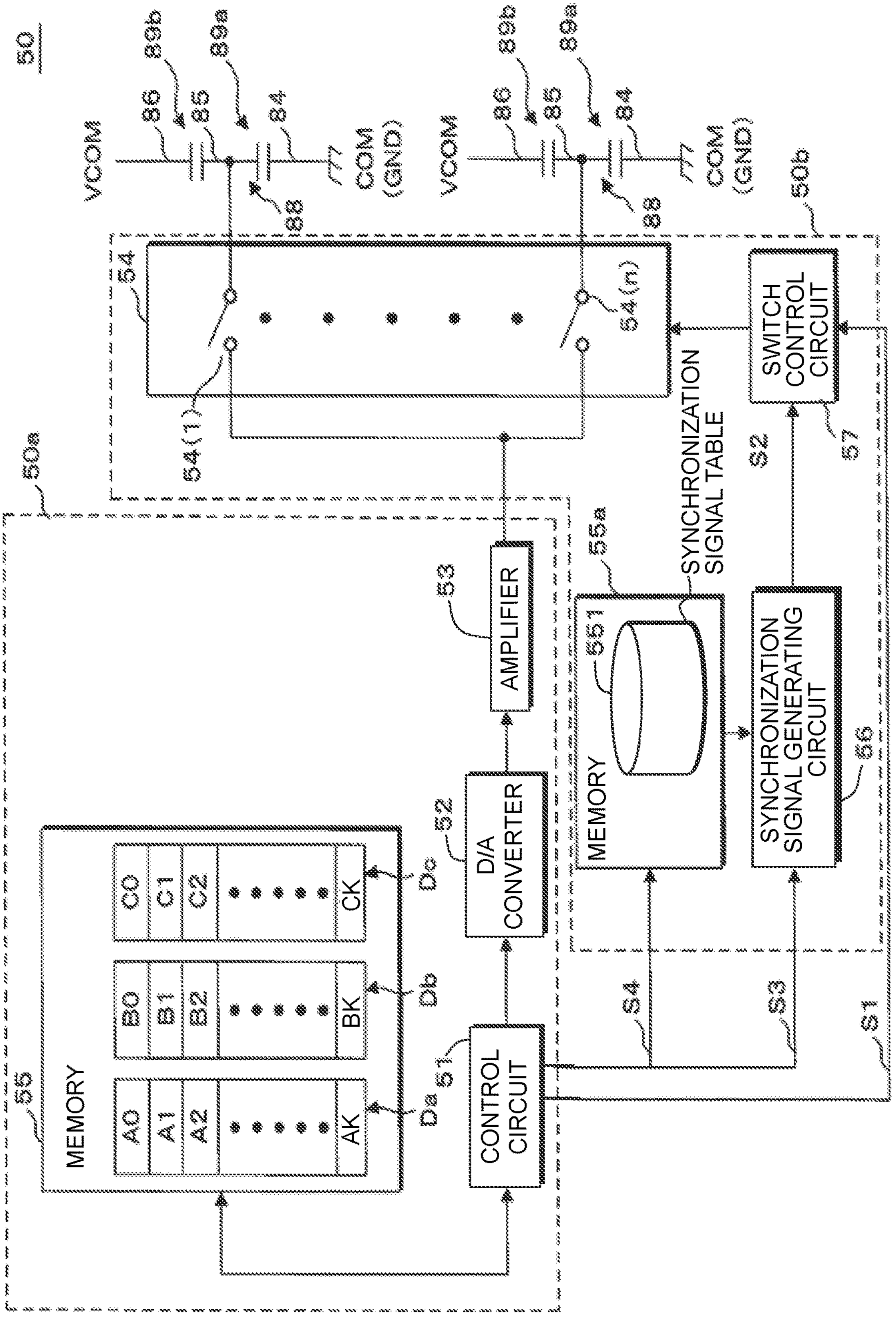
FIG. 17 is a block diagram of a controller.

A seventh embodiment of the present disclosure will be explained below on the basis of the drawing which depicts a printing apparatus 1 according to the seventh embodiment. Constitutive components according to the seventh embodiment, which are the same as or equivalent to the constitutive components according to the first embodiment, are designated by the same reference numerals as those of the first embodiment, and any detailed explanation will be omitted. FIG. 17 is a block diagram of the controller 50 according to the seventh embodiment. FIG. 18 is an explanatory view depicting an example of a synchronization signal table 551.

In each of the embodiments described above, the synchronization signal S2 is generated by delaying the rising edge (time point of the rising edge) of the generation instruction signal S3 by a predetermined time period. However, a method of generating the synchronization signal S2 is not limited thereto. In the seventh embodiment, the separating circuit 50*b* includes a memory 55*a* storing the synchronization signal table 551. The synchronization signal generating circuit 56 generates the synchronization signal S2 on the basis of the synchronization signal table 551. Note that the memory 55*a* may be arranged at the outside of the separating circuit 50*b*, for example, on a carriage or on a head bar.

The memory 55*a* is a volatile memory such as DRAM, SRAM, and the like. Note that, the memory 55*a* may be a nonvolatile memory. The control circuit 51 transmits the synchronization signal table 551, which has been read out from the external device 100 or undepicted nonvolatile memory, to the memory 55*a* as a storing instruction signal S4 when, for example, the main power supply of the printing apparatus 1 is turned on. When the storing instruction signal S4 is transmitted to the memory 55*a* from the control circuit 51, the memory 55*a* stores the synchronization signal table 551. Note that, the control circuit 51 may update the synchronization signal table 551 stored in the memory 55*a* by reading out the synchronization signal table 551 from the external device 100 or the undepicted volatile memory periodically and transmitting the read synchronization signal table 551 to the memory 55*a* periodically. In the example depicted in FIG. 17, the storing instruction signal S4 and the generation instruction signal S3 are transmitted via single signal line shared by the storing instruction signal S4 and the generation instruction signal S3. However, the storing instruction signal S4 may be transmitted via a signal line dedicated to the storing instruction signal S4. The storing instruction signal S4 may be transmitted via single signal line with the switch control signal S1, the single signal line being shared by the storing instruction signal S4 and the switch control signal S1.

As depicted in FIG. 18, timings at each of which a pulse of each of the synchronization signals S2 (that is, synchronization signals S2*a* to S2*c*) rises are stored in the synchronization signal table 551. Management items (fields) of the synchronization signal table 551 includes, for example, a synchronization signal field and a bit string field. The synchronization signal field stores types of the synchronization signals S2 to be generated. The bit string field stores information indicating, based on bit strings, timings at each of which the pulse of each of the synchronization signals S2 rises. In the example depicted in FIG. 18, one bit corresponds to one of the timings each of which is defined to have a time interval (time period) of Δt. A bit corresponding to a timing at which the pulse does not rise is indicated by "0", and a bit corresponding to a timing at which the pulse rises is indicated by "1".

When the generation instruction signal S3 is transmitted from the control circuit 51 to the synchronization signal generating circuit 56, the synchronization signal generation circuit 56 reads out the synchronization signal table 551 from the memory 55*a*, and then generates the synchronization signal S2 on the basis of the generation instruction signal S3 and the synchronization signal table 551. Specifically, the synchronization signal generating circuit 56 generates each of the synchronization signals S2 (see, FIG. 6) by rising a pulse at a timing at which the bit is "1", provided that the first bit of each of the bit strings corresponds to a timing at which the first pulse of the generation instruction signal S3 rises.

Modified Embodiment

In the first embodiment, the generation instruction signal is transmitted from the control circuit 51 to the synchronization signal generating circuit 56 at the timing of the undischarge flushing processing, but the present disclosure is not limited to this. It is allowable that a detection circuit which detects a deviation in the synchronization signal generated by the synchronization signal generating circuit 56 is provided; that in a case that the detection circuit detects the deviation in the synchronization signal generated by the synchronization signal generating circuit 56, the detection circuit transmits a signal to the control circuit 51; and that the generation instruction signal S3 is transmitted from the control circuit 51 to the synchronization signal generating circuit 56.

The embodiments disclosed herein are exemplary in all senses, and should be interpreted not restrictive or limiting in any way. The technical features described in the respective embodiments can be combined with each other, and the scope of the present invention is intended to encompass all the changes within the scope of the claims and a scope equivalent to the scope of the claims.

What is claimed is:

1. A printing apparatus comprising:

a nozzle configured to discharge a liquid by an energy generating element;

a head including the energy generating element and the nozzle;

a signal generating circuit configured to generate, based on at least a first data representing a first driving waveform and a second data representing a second driving waveform different from the first driving waveform, a time division multiplex signal including a first portion being a part of the first driving waveform, a second portion being an other part of the first driving waveform, a third portion being a part of the second driving waveform and a fourth portion being an other part of the second driving waveform;

a separating circuit to which the time division multiplex signal is inputted and which includes a switch configured to separate, from the time division multiplex signal, a first driving waveform signal representing the first driving waveform or a second driving waveform signal representing the second driving waveform, based on a synchronization signal; and a synchronization signal generating circuit configured to generate the synchronization signal indicating an opening and closing timing of the switch, wherein in the time division multiplex signal, the third portion being the part of the second driving waveform is aligned between the first portion being the part of the first driving waveform and the second portion being the other part of the first driving waveform, and the second portion being the other part of the first driving waveform is aligned between the third portion being the part of the second driving waveform and the fourth portion being the other part of the second driving waveform;

the time division multiplex signal is capable of transmitting the first data and the second data via a single signal line; and the synchronization signal generating circuit is a circuit different from the signal generating circuit.

2. The printing apparatus according to claim 1, wherein the separating circuit has a housing, and wherein the synchronization signal generating circuit is arranged in an inside of the housing of the separating circuit.

3. The printing apparatus according to claim 1, wherein the separating circuit has a housing, and wherein the synchronization signal generating circuit is arranged at an outside of the housing of the separating circuit.

4. The printing apparatus according to claim 3, wherein the synchronization signal generating circuit is provided on a carriage which reciprocates the head in a moving direction.

5. The printing apparatus according to claim 3, wherein the synchronization signal generating circuit is provided on a head bar configured to hold the head.

6. The printing apparatus according to claim 1, further comprising a memory, wherein the synchronization signal generating circuit is configured to generate the synchronization signal based on information stored in the memory, the information indicating a timing at which a pulse of the synchronization signal rises.

7. The printing apparatus according to claim 1, further comprising: a signal line configured to transmit, from the signal generating circuit to the synchronization signal generating circuit, a generation instruction signal for instructing generation of the synchronization signal.

8. The printing apparatus according to claim 7, wherein the signal line is a dedicated signal line for the generation instruction signal, the dedicated signal line being configured not to transmit any signal other than the generation instruction signal.

9. The printing apparatus according to claim 7, wherein the signal line is configured to transmit a plurality of signals including the generation instruction signal.

10. The printing apparatus according to claim 9, wherein the signal line is configured to transmit the time division multiplex signal.

11. The printing apparatus according to claim 9, wherein the signal line is configured to transmit a switch control signal for opening and closing the switch.

12. The printing apparatus according to claim 9, wherein in the signal line, the generation instruction signal is transmitted during a period of time, a signal different from the generation instruction signal being not transmitted in the period of time.

13. The printing apparatus according to claim 7, wherein in a case that a printing processing is to be executed, the signal generating circuit is configured to transmit the generation instruction signal, and the synchronization signal generating circuit is configured to generate the synchronization signal.

14. The printing apparatus according to claim 7, wherein in a case that a flushing processing of discharging the liquid from the nozzle is to be executed, the signal generating circuit is configured to transmit the generation instruction signal, and the synchronization signal generating circuit is configured to generate the synchronization signal.

15. The printing apparatus according to claim 7, wherein in a case that an undischarge flushing processing of vibrating inside of the nozzle is to be executed, the signal generating circuit is configured to transmit the generation instruction signal, and the synchronization signal generating circuit is configured to generate the synchronization signal.

16. A method of controlling driving of a printing apparatus including an energy generating element configured to cause a nozzle to discharge a liquid, the method comprising:

generating, based on at least a first data representing a first driving waveform and a second data representing a second driving waveform different from the first driving waveform, a time division multiplex signal including a first portion being a part of the first driving waveform, a second portion being an other part of the first driving waveform, a third portion being a part of the second driving waveform and a fourth portion being an other part of the second driving waveform, by a signal generating circuit;

separating a first driving waveform signal representing the first driving waveform or a second driving waveform signal representing the second driving waveform from the time division multiplex signal, by a switch of a separating circuit;

generating a synchronization signal, which indicates an opening and closing timing of the switch, by a synchronization signal generating circuit; and driving the energy generating element by the first driving waveform signal or the second driving waveform signal separated by the separating circuit, wherein in the time division multiplex signal, the third portion being the part of the second driving waveform is aligned between the first portion being the part of the first driving waveform and the second portion being the other part of the first driving waveform, and the second portion being the other part of the first driving waveform is aligned between the third portion being the part of the second driving waveform and the fourth portion being the other part of the second driving waveform;

the time division multiplex signal is capable of transmitting the first data and the second data via a single signal line; and the synchronization signal generating circuit is a circuit different from the signal generating circuit.

17. A non-transitory and computer-readable medium storing a program thereon, the program being executable by a controller of a printing apparatus which includes an energy generating element configured to cause a nozzle to discharge a liquid, the program is configured to cause the controller to:

cause a signal generating circuit to generate, based on at least a first data representing a first driving waveform and a second data representing a second driving waveform different from the first driving waveform, a time division multiplex signal including a first portion being a part of the first driving waveform, a second portion being an other part of the first driving waveform, a third portion being a part of the second driving waveform and a fourth portion being an other part of the second driving waveform;

cause a switch of a separating circuit to separate, from the time division multiplex signal, a first driving waveform signal representing the first driving waveform or a second driving waveform signal representing the second driving waveform;

cause a synchronization signal generating circuit to generate a synchronization signal indicating an opening and closing timing of the switch; and drive the energy generating element by the first driving waveform signal or the second driving waveform signal separated by the separating circuit, wherein in the time division multiplex signal, the third portion being the part of the second driving waveform is aligned between the first portion being the part of the first driving waveform and the second portion being the other part of the first driving waveform, and the second portion being the other part of the first driving waveform is aligned between the third portion being the part of the second driving waveform and the fourth portion being the other part of the second driving waveform;

the time division multiplex signal is capable of transmitting the first data and the second data via a single signal line; and the synchronization signal generating circuit is a circuit different from the signal generating circuit.

* * * * *